(12) United States Patent
Foegelle

(10) Patent No.: US 10,581,538 B2
(45) Date of Patent: Mar. 3, 2020

(54) DISTRIBUTED SYSTEM FOR RADIO FREQUENCY ENVIRONMENT SIMULATION

(71) Applicant: ETS-Lindgren Inc., Cedar Park, TX (US)

(72) Inventor: Michael David Foegelle, Cedar Park, TX (US)

(73) Assignee: ETS-Lindgren, Inc., Cedar Park, TX (US)

( * ) Notice: Subject to any disclaimer, the term of this patent is extended or adjusted under 35 U.S.C. 154(b) by 142 days.

(21) Appl. No.: 15/222,007

(22) Filed: Jul. 28, 2016

(65) Prior Publication Data

US 2018/0034562 A1 Feb. 1, 2018

(51) Int. Cl.
*H04B 17/00* (2015.01)
*H04B 17/364* (2015.01)

(52) U.S. Cl.
CPC ....... *H04B 17/364* (2015.01); *H04B 17/0085* (2013.01)

(58) Field of Classification Search
CPC combination set(s) only.
See application file for complete search history.

(56) References Cited

U.S. PATENT DOCUMENTS

| | | | |
|---|---|---|---|
| 6,771,698 B1 | 8/2004 | Beck | |
| 7,013,257 B1 | 3/2006 | Nolan et al. | |
| 7,167,782 B2 | 1/2007 | Humbard et al. | |
| 7,539,489 B1 * | 5/2009 | Alexander | H04W 24/06 370/241 |
| 7,593,459 B1 | 9/2009 | Venkatesh et al. | |
| 9,130,667 B2 | 9/2015 | Sozanski et al. | |
| 9,819,425 B2 | 11/2017 | Hamon et al. | |
| 2006/0209866 A1 | 9/2006 | Steenkiste et al. | |
| 2006/0229020 A1 | 10/2006 | Mlinarsky et al. | |
| 2007/0127559 A1 | 6/2007 | Chang | |
| 2008/0020746 A1 | 1/2008 | Alexander et al. | |
| 2008/0084951 A1 | 4/2008 | Chen et al. | |
| 2008/0129615 A1 | 6/2008 | Breit et al. | |
| 2008/0305754 A1 * | 12/2008 | Foegelle | H04W 24/00 455/115.1 |
| 2008/0309565 A1 | 12/2008 | Villarroel et al. | |

(Continued)

FOREIGN PATENT DOCUMENTS

JP 8265234 A 10/1996
JP H08265234 A 10/1996

(Continued)

OTHER PUBLICATIONS

Office Action dated May 19, 2017 in U.S. Appl. No. 15/221,959 consisting of 15-pages.

(Continued)

*Primary Examiner* — Zhiyu Lu
(74) *Attorney, Agent, or Firm* — Christopher & Weisberg, P.A.

(57) ABSTRACT

In some embodiments, an electromagnetic measurement system to test a device under test, DUT, in a chamber is provided. Within the chamber, for each of at least one emulated channel, a first emulator core is configured to introduce an impairment in each of at least one transmit signal to produce an impaired signal, and a transmitter is configured to convert the impaired signal to a radio frequency, RF, signal to be transmitted by an antenna.

19 Claims, 16 Drawing Sheets

(56) References Cited

U.S. PATENT DOCUMENTS

| | | |
|---|---|---|
| 2009/0094492 A1* | 4/2009 | Music .................. G06F 11/261 714/715 |
| 2009/0231217 A1 | 9/2009 | Grange et al. |
| 2011/0124295 A1* | 5/2011 | Mahjoubi Amine ....................... H04B 17/0087 455/67.14 |
| 2011/0230143 A1 | 9/2011 | Lundstrom et al. |
| 2011/0299570 A1 | 12/2011 | Reed |
| 2012/0071107 A1 | 3/2012 | Falck et al. |
| 2012/0098713 A1 | 4/2012 | Mow et al. |
| 2012/0100813 A1* | 4/2012 | Mow .................. H04B 17/12 455/67.12 |
| 2012/0176906 A1 | 7/2012 | Hartenstein et al. |
| 2013/0006601 A1 | 1/2013 | Mlinarsky et al. |
| 2013/0059545 A1 | 3/2013 | Kyosti et al. |
| 2014/0241408 A1* | 8/2014 | Sozanski ............ H04B 17/0087 375/224 |
| 2014/0273873 A1 | 9/2014 | Huynh |
| 2015/0016290 A1 | 1/2015 | Greising et al. |
| 2015/0017928 A1 | 1/2015 | Greising et al. |
| 2015/0054687 A1 | 2/2015 | Reed |
| 2016/0036471 A1 | 2/2016 | Subrahmaniyan Radhakrishnan |
| 2016/0212641 A1 | 7/2016 | Kong et al. |
| 2016/0254870 A1 | 9/2016 | O'Keefe et al. |
| 2016/0285572 A1 | 9/2016 | Manghal et al. |
| 2016/0344490 A1 | 11/2016 | Foegelle |
| 2017/0279546 A1 | 9/2017 | McGarry et al. |

FOREIGN PATENT DOCUMENTS

| | | |
|---|---|---|
| JP | 2012251783 A | 12/2012 |
| KR | 20100103111 A | 9/2010 |

OTHER PUBLICATIONS

Office Action dated Jul. 28, 2017 in U.S. Appl. No. 15/221,981 consisting of 11-pages.

Office Action dated Aug. 9, 2017 in U.S. Appl. No. 15/222,018 consisting of 15-pages.

Office Action dated Aug. 24, 2017 in U.S. Appl. No. 15/221,944 consisting of 13-pages.

European Search Report dated Dec. 19, 2017 in Application No. EP17179167 consisting of 41-pages.

Office Action dated Jul. 6, 2018 in U.S. Appl. No. 15/221,959 consisting of 9-pages.

European Search Report for Application No. EP19158622.1, dated Mar. 26, 2019, Consisting of 4 pages.

* cited by examiner

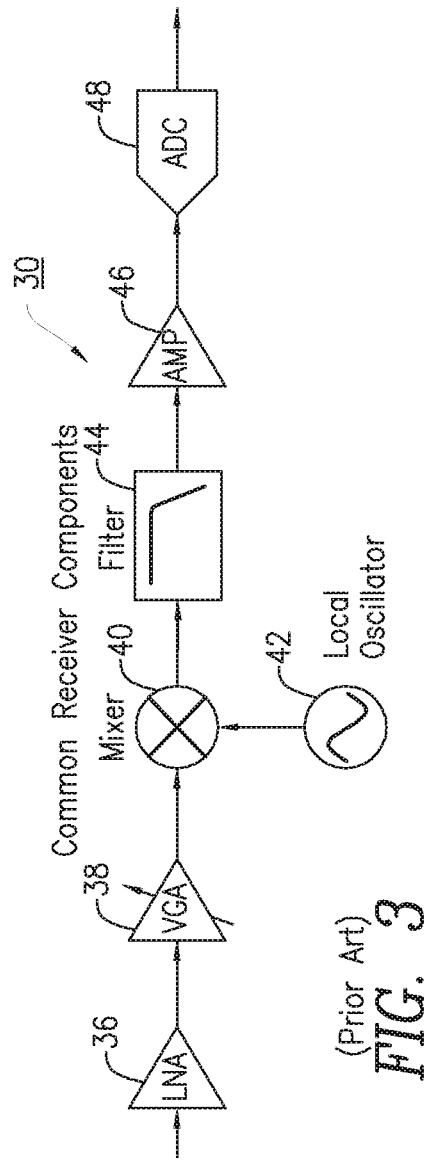
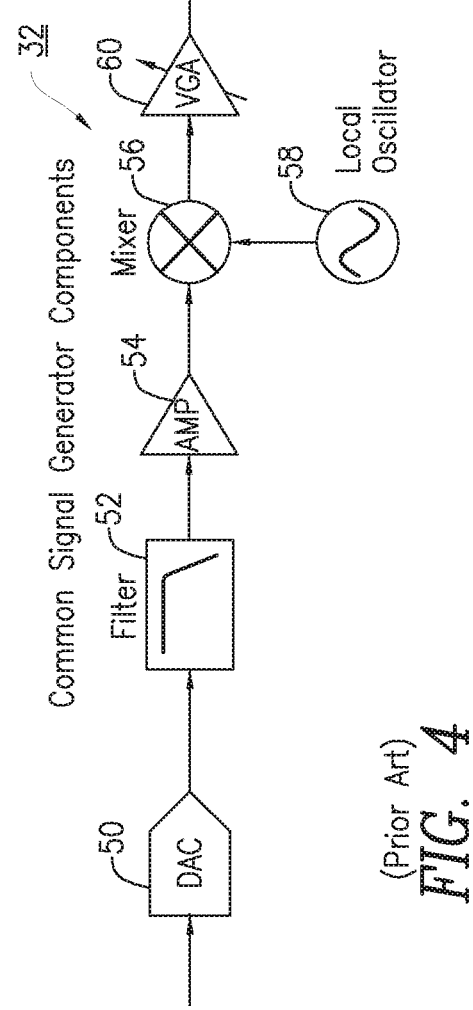

DISTRIBUTED SYSTEM FOR RADIO FREQUENCY ENVIRONMENT SIMULATION

TECHNICAL FIELD

This disclosure relates to a method and system for emulating channels in a radio frequency (RF) communication system including systems that operate in the micro-wave and milli-meter wave frequency ranges.

BACKGROUND

U.S. Pat. No. 8,331,869 describes systems and methods for over-the-air performance testing of wireless devices with multiple antennas. This class of system, referred to as a boundary array system, reproduces a radiated near-field environment that appears to the device in the test volume as though it originated in the far field and had the multipath characteristics of a chosen emulated environment.

FIG. 1 is a typical multiple input multiple output (MIMO) boundary array configuration 10 for a test of a device under test (DUT) 22, showing boundary array antennas 12 in an anechoic chamber 14 with a wireless communication tester 16 connected through a spatial channel emulator 18 and amplifiers 20. Splitters 28 may be interposed between the wireless communication tester 16 and the spatial channel emulator 18. Some configurations require multiple individual channel emulators synchronized together to produce sufficient output channels to drive all of the antenna elements in the chamber. The test configuration of FIG. 1 is typically used to evaluate the receiver performance of DUT 22. When the DUT 22 is a cellular phone, for example, the test configuration of FIG. 1 would evaluate the downlink signal from the base station to the mobile phone. When the DUT 22 is a base station, for example, the test configuration of FIG. 1 is would evaluate the uplink signal from the mobile phone to the base station. For simplicity, this document will refer to the DUT receiver test configuration as the downlink, and the DUT transmit test configuration as the uplink. The configuration of FIG. 1 is uni-directional for simplicity. Bi-directional systems are also employed.

The device under test (DUT) 22 is positioned on a positioner, such as a turntable, within a test volume of the anechoic chamber 14 that is isolated from the environment exterior to the anechoic chamber 14 by RF absorber lined walls, floor and ceiling. The array of antennas 12 radiate electromagnetic energy (radio waves) toward the DUT in a variety of directions. The radiated signals from each of the antennas 12 have various impairments (delay spread, Doppler, interference, etc.) applied through spatial channel emulator 18 to simulate multipath fading in a real world environment.

The various impairments are introduced into signals received from the wireless communication tester 16 by one or more spatial channel emulators 18 that digitize the received signals. The digitized received signals are delayed and weighted in amplitude by the spatial channel emulator 18. More particularly, the spatial channel emulator 18 may add multipath delay, delay spread, fading, interference, and other impairments common in typical radiated communication paths, and then converts the result to analog signals and up-converts the result to a radio frequency, RF. Thus, each output of the spatial channel emulators 18 may be the sum of multiple replicas of the input signal delayed and weighted according to a channel model definition, and will vary in time based on a motion definition that models relative motion of the DUT 22 or an intervening reflector. Doppler frequency shift may also be introduced arising from the relative motion. Interference may also be introduced by adding additive white Gaussian noise (AWGN) or other noise as well as by injecting specific interfering signals. The full panoply of channel effects emulated by the channel emulator are referred to herein collectively as impairments.

In a typical configuration, the number of inputs to the spatial channel emulator 18 may be different from the number of outputs of the spatial channel emulator 18. Splitters 28 may be interposed between the wireless communication tester 16 and the spatial channel emulator 18. Each output of the spatial channel emulator 18 is amplified by a power amplifier 20 and directed on a path, typically provided by cables, to an antenna 12. The spatial channel emulator emulates a plurality of channels, each channel being associated with a different one of the antennas 12.

Amplification is required between the spatial channel emulator 18 and the antennas 12 in order to produce sufficient radiated power to be received by the DUT on the downlink and to amplify the weak signals received from the DUT to be well above the receiver sensitivity of the channel emulator on the uplink. The wireless communication tester 16 emulates an end of a radio link opposite the DUT. The uplink is the path of signal propagation from the DUT 22 to the wireless communication tester 16 (these paths not being shown in FIG. 1).

The wireless communication tester generates signals according to a communication protocol of the DUT. For example, the wireless communication tester 16 may generate transmit signals that are formatted for long term evolution (LTE) signaling, and may receive signals from the DUT that are also formatted for LTE signaling. Other communication protocols, such as Wi-Fi, may be employed by the wireless communication tester 16. Also shown is a communication antenna 24 coupled to a low noise amplifier (LNA) which is connected to the wireless communication tester 16. The purpose of the communication antenna 24 is to provide an alternate, un-faded and potentially low loss communication path between the DUT and the communication tester for signals that are unrelated to the metric being tested on the DUT (e.g. closed loop feedback of a digital error rate during a receiver sensitivity test) in order to maintain the full communication link.

FIG. 2 is an implementation of one example of an RF channel emulator 18 that includes emulator receivers (vector signal analyzers) 30 and emulator transmitters (vector signal generators) 32 around a digital signal processing channel emulator core 34. In the channel emulator core, each signal may be impaired and added to other signals to produce impaired signals in order to simulate the effects of one or more signals propagating over the air, being reflected off of obstacles such as buildings, and arriving at the DUT with different amplitudes and phases. Doppler shift may also be introduced by the channel emulator core 34.

Common components of the emulator receivers 30 are shown in FIG. 3. A low noise amplifier 36 receives an RF signal, possibly having a low SNR, and amplifies the RF signal and optionally passes the amplified RF signal to a further amplification stage that includes a variable gain amplifier 38. The amplified RF signal is down-converted in a mixer 40 with a local oscillator (LO) signal from an LO 42 to produce an intermediate frequency (IF) or baseband signal that is filtered by a filter 44, and possibly further amplified by an amplifier 46. The signal output of the amplifier 46 is an analog signal which may be converted to a digital signal by an analog to digital converter (ADC) 48.

Common components of the emulator transmitters 32 are shown in FIG. 4 that include a digital to analog converter (DAC) 50, a filter 52, and an amplifier 54. The signal that passes through these components may be at baseband or at an intermediate frequency. The signal is then mixed in a mixer 56 with a local oscillator signal from an LO 58. The output of the mixer is an RF signal that may be further amplified by a variable gain amplifier (VGA) 60.

FIG. 5 is a single emulated downlink channel between a wireless communication tester 16 and a DUT 22. (For simplicity, we shall call the direction of propagation of FIG. 5 the downlink direction). In the downlink, the wireless communication tester 16 generates transmit signals to be received over the air by the wireless device, DUT 22. The transmit signals from the wireless communication tester are routed to the spatial channel emulator 18a by signal routing 62a, which may be, for example, coaxial cables, and switches that would enable switching to calibration paths or other test paths (not shown) in order to provide flexibility to alter the configuration as desired. Note that there may be any number of RF paths between the wireless communication tester 16 and the spatial channel emulator 18 for multiple input multiple output (MIMO) or diversity testing, all of which are combined into a single RF path for each antenna element at the output of the spatial channel emulator 18.

The spatial channel emulator 18a replicates each signal received from the communication tester 16, impairs each replica in a different way, and combines the impaired replicas to produce an impaired signal of the channel. Note that the applied impairments may simulate multipath effects as well as Doppler shift and other time and frequency dependent effects. The impaired signal output by the spatial channel emulator 18a is an RF signal that is coupled by signal routing 62b to an amplifier 64 to be amplified. The output of the amplifier 64 is routed to the anechoic chamber 14 to the antenna 12 by signal routing 62c. The antenna 12 radiates the impaired signal to the device under test 22. Note that the signals carried by the signal routing, herein referred to collectively as signal routing 62, are RF signals, and thus, may exhibit significant losses.

FIG. 6 is a single emulated uplink channel between a DUT 22 and a wireless communication tester 16. (For simplicity, we shall call the direction of propagation of FIG. 6 the uplink direction). Signals radiated by the DUT 22 are received by the antenna 12 which converts the electromagnetic radiation (radio waves) to an RF signal which is amplified by a low noise amplifier (LNA) 36. The RF output of the LNA 36 is coupled out of the anechoic chamber 14 to the spatial channel emulator 18b by signal routing 62d. The spatial channel emulator 18b may apply different impairments to replicas of the received RF signal to form impaired signals to simulate a multipath, Doppler-shifted environment. The output of the spatial channel emulator 18b is at least one output signal that is coupled by signal routing 62e to the wireless communication tester 16.

Note once again that the signal routing 62 carry RF signals, and thus, the signal routing 62 introduce significant losses. As with the downlink chain of FIG. 5, in the uplink configuration of FIG. 6, there may be any number of RF paths between the spatial channel emulator 18 and the wireless communication tester 16 for MIMO or diversity testing. The RF paths may be derived from a single RF signal at the input of the spatial channel emulator 18.

Note that bidirectional channel emulation can be performed with two separate, synchronized channel emulators 18a and 18b or as a single bi-directionally configured unit. Each channel emulator block may also be realized by a plurality of channel emulators, referred to herein collectively as spatial channel emulators 18.

While the boundary array technique is a powerful mechanism that can theoretically produce any desired RF environment, the capabilities of currently available RF test equipment provide physical, practical, and financial limits to what can be achieved with the system.

The ability to produce a uniquely correlated spatial distribution within the test volume is governed by the same Nyquist theorem limitations of near-to-far-field conversion, whereby a spherical surface surrounding the DUT should have at least two sampling points (antenna directions) per wavelength along the surface of the sphere. The larger the antenna separation or general RF interactive region on the DUT, the more active antennas are needed in the boundary array in order to produce the proper RF environmental conditions.

In addition to the physical constraints of the antenna size around the perimeter of the test volume, which forces a larger array diameter as the number of antennas 12 increases, the number of amplifier and channel emulator resources required increases by as much as four times the number of antenna locations. Since each antenna location may be called upon to support two antenna elements in orthogonal polarizations (i.e. a dual polarized antenna), and assuming bi-directional communication, each antenna location requires four amplifiers connected to two channel emulator transmitters and two channel emulator receivers remote from the antenna locations. In addition, for full spherical coverage, the number of required antennas increases as the square of the frequency to be tested multiplied by the maximal radial extent (MRE) dimension of the DUT, i.e. $N \propto (f\ r)^2$ or $N \propto (r/\lambda)^2$, where r is the radial dimension, N is the number of antennas, and $\lambda$ is the wavelength. Stated simply, as the test frequency and/or DUT size increases, the number of required antennas increases.

Since RF channel emulators 18 were originally designed for conducted testing of radio transmitters and receivers, adapting them for use in over-the-air testing conditions requires the addition of amplification to overcome the losses associated with RF cables, antenna efficiencies of both the boundary array antennas 12 and antennas of the DUT 22, and free-space path losses due to the range length. Since the power amplifiers 20 are independent of the power control of the spatial channel emulator 18, they must provide highly linear performance in order to generate the expected power levels within the test volume.

Likewise, since power control occurs before amplification on the downlink, the desired signal level moves closer to the instrumentation noise floor and then both signal and noise are amplified and injected into the chamber, where the instrumentation noise may become a significant portion of the signal-to-noise ratio (SNR) seen at the DUT receiver. The noise figure of the power amplifier is also added to the noise of the channel emulator and other instrumentation, thereby decreasing the SNR.

Similarly, on the uplink, the signal received at the boundary array antenna 12 from the DUT 22 is well below the signal level expected at the input to the spatial channel emulator 18, so low noise amplification is required to boost it above the receiver sensitivity of the spatial channel emulator 18. Since cable losses associated with bringing the signal out of the anechoic chamber 14 to the spatial channel emulator 18 input add to the loss, the resulting negative impact on signal to noise ratio is increased.

Also, bi-directional communication where both downlink and uplink signals are present simultaneously requires the introduction of some form of isolation to ensure that the high power output of the downlink amplifier is not coupled into the highly sensitive input of the lower noise amplifier. Any cross coupling between the two amplifiers can severely degrade system performance and is highly likely to cause damage on the uplink side, either at the amplifier and/or the input to the channel emulator 18b.

Since conventional spatial channel emulators 18 are large rack mount pieces of test equipment that reside outside the shielded anechoic chamber 14, as the number of antenna locations increases, not only does the range length increase, but the required length of all cables between the channel emulators 18 and amplifiers 20 and the boundary array antennas 12 generally increases by at least π times the increase in radius. While the free-space path loss increases logarithmically with the increase in radius, the loss of an RF cable is a linear function of the cable length. Thus, eventually the cable losses can dominate the losses of the system as the system is scaled up to include more channels.

Conversely, in suitable instrumentation amplification, there is an upper limit to the output power of a single power transistor, so that increasing the amplification to overcome additional path loss becomes a problem of parallel amplification rather than series amplification, with the associated complexities of combining the power at the output. The result is that the associated size, cost, heat generation, etc. for the larger amplifiers grows exponentially as the linear output power increases. Finally, the number of required RF cables also increases by the same four times the number of probe positions that the amplifiers and channel emulation must increase.

As to the wireless communication tester 16, the process of generating an RF signal and then tuning and digitizing it in order to perform the channel emulation via the spatial channel emulator 18 introduces additional error and uncertainty into the signals for both uplink and downlink.

Thus, one problem with existing systems is the RF path loss associated with the distances involved and the amplification required to overcome these losses. The use of existing centralized RF channel emulators designed for conducted testing coupled with the expensive high power amplifiers needed to overcome this path loss results in most of the expense of the amplification being spent to heat up the RF cables due to internal losses.

SUMMARY

In some embodiments, an electromagnetic measurement system to test a device under test, DUT, in a chamber is provided. Within the chamber, for each of at least one emulated channel, a first emulator core is configured to introduce an impairment in each of at least one transmit signal to produce an impaired signal, and a transmitter is configured to convert the impaired signal to a radio frequency, RF, signal to be transmitted by an antenna.

In some embodiments, the chamber is one of an anechoic chamber and a reverberation chamber. In some embodiments, the impairment is at least one of an amplitude weighting and a temporal shift. In some embodiments, the system further includes, within the chamber, for each of the at least one emulated channel, a communication tester configured to emulate the at least one transmit signal. In some embodiments, the system further includes, within the chamber, for each of the at least one emulated channel, a receiver configured to receive a radio frequency, RF, signal from the antenna and convert the received RF signal to a down-converted signal, and a second emulator core to introduce an impairment in each of at least one replica of the down converted signal to produce at least one output signal. In some embodiments, within the chamber, for each of the at least one emulated channel, a communication tester is configured to receive and test the at least one output signal.

In some embodiments, an electromagnetic measurement system to test a device under test, DUT, in a chamber is provided. Within the chamber, for each of a plurality of emulated channels, a first emulator core is configured to introduce an impairment in each of at least one transmit signal to produce a first impaired signal and a second impaired signal. Also within the chamber, a first transmitter is configured to convert the first impaired signal to a first radio frequency, RF, signal to be transmitted by an antenna according to a first polarization, and a second transmitter configured to convert the second impaired signal to a second RF signal, to be transmitted by the antenna according to a second polarization.

In some embodiments, the chamber is one of an anechoic chamber and a reverberation chamber. In some embodiments, the impairment is at least one of an amplitude weighting and a temporal shift. In some embodiments, the system further includes, within the chamber, for each of the at least one emulated channel, a communication tester configured to emulate the plurality of transmit signals. In some embodiments, each antenna includes a pair of orthogonally polarized antenna elements.

In some embodiments, the system further includes, within the chamber, for each of the at least one emulated channel: a first receiver configured to receive a first RF signal from the antenna according to a first polarization and convert the received first RF signal to a first down-converted signal; a second receiver configured to receive a second RF signal from the antenna according to a second polarization and convert the second RF signal from the antenna to second down-converted signal; and a second emulator core to introduce a different delay spread in each of at least one replica of the first and second down converted signals to produce at least one output signal. In some embodiments, the system further includes, within the chamber, for each of the at least one emulated channel, a wireless communication tester configured to receive and test the at least one output signal. In some embodiments, exterior to the chamber, there is at least one emulator transmitter to transmit the at least one output signal to a wireless communication tester.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein:

FIG. 3 is a block diagram of common components of an emulator receiver;

FIG. 4 is a block diagram of common components of an emulator transmitter;

DETAILED DESCRIPTION

Figure 1:
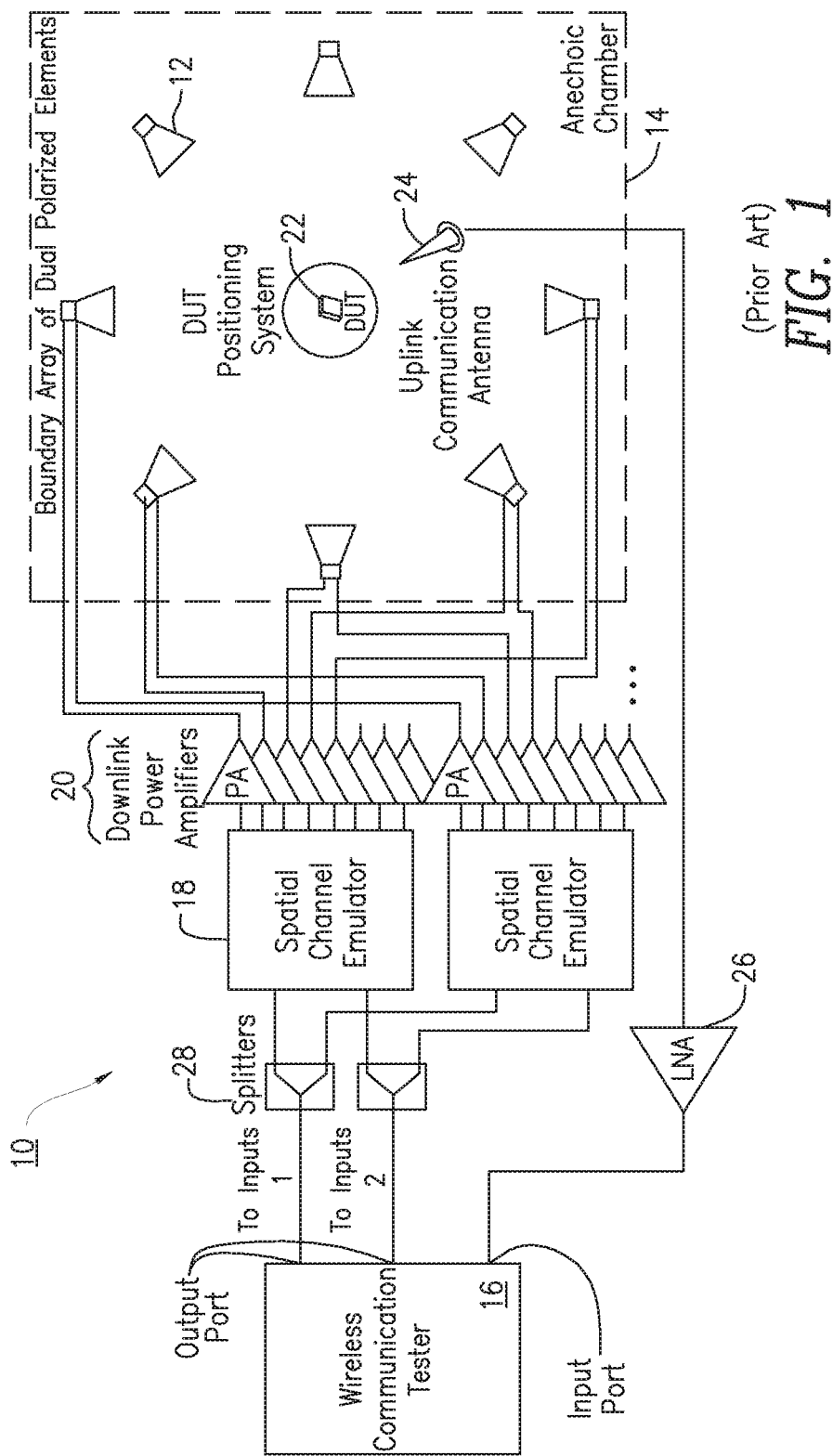
FIG. 1 is a block diagram of a known uni-directional boundary array measurement system.
Figure 2:
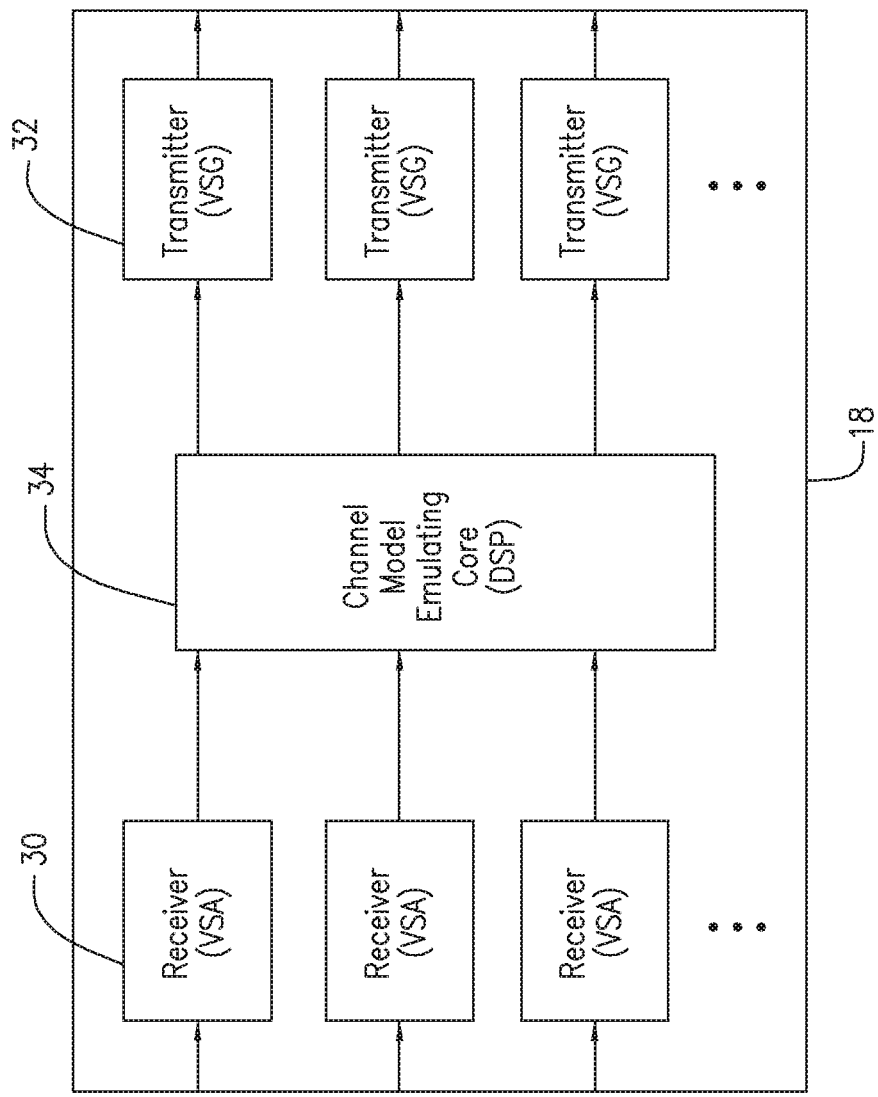
FIG. 2 is a schematic illustration of a known spatial channel emulator for a typical conducted radio test.

Before describing in detail exemplary embodiments, it is noted that the embodiments reside primarily in combinations of apparatus components and processing steps related to electromagnetic measurement systems for testing devices. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments include a distributed channel emulation system. In some embodiments, functions of a spatial channel emulator are distributed between a central location and a remote location. In some embodiments, for example, the up and down converters of the distributed channel emulation system may be located in a remote location, such as in a test chamber, while the emulator core remains in a central location. As used herein, the remote location may be where antennas of an electromagnetic measurement system are located. The central location is apart from the remote location and may have a user interface to control tests performed by the electromagnetic measurement system. By distributing components of the spatial channel emulator to a remote location, low loss cables can be used to carry intermediate frequency (IF) signals or baseband signals from the central location to the remote location with much lower loss as compared with transmission of higher radio frequency (RF) signals.

In some embodiments, the digital to analog conversion on the uplink, and the analog to digital conversion on the downlink are also located in the remote location with the up and down converters, while the emulator core remains in the central location.

In some embodiments, the emulator core is also located in the remote location. In some embodiments, a wireless communication tester and channel emulator are located in a remote location, such as in a test chamber, in proximity to each of a plurality of antennas. Each combination of wireless communication tester and channel emulator is synchronized with other combinations of wireless communication tester and channel emulator. In some embodiments, a dual boundary array is provided.

In embodiments described herein, reference will be made to an emulated channel. An emulated channel is a channel that is emulated by an electronic manipulation of signals to emulate the effects of a channel between a first device, such as a base station or wireless radio, and a second device, such as the DUT. For example, in a real world environment, an RF signal from a base station to a wireless device, such as a cell phone, leaves the base station and bounces off walls of buildings and the ground so that an RF signal will arrive at the wireless device from different directions at different times. Also, if the wireless device is in motion relative to the source or other objects in the environment, the RF signal arriving at the wireless device may be shifted in frequency. This is known as Doppler shift. Note that the term, RF, as used herein encompasses, without limitation, microwave and millimeter wave frequencies.

The spatial channel emulator described herein can be programmed to introduce impairments in replicas of a signal from the wireless communication tester to produce signals that emulate the various impairments of an RF signal propagating through a real-world channel. The spatial channel emulator may also be programmed to emulate Doppler shift. Similar to the channel effects on the downlink RF signals transmitted to the DUT, channel effects on the uplink RF signals received from the DUT may also be emulated. That is, on the uplink, the spatial channel emulator may emulate an actual channel between the DUT and a base station by introducing impairments of replicas of a signal received from the DUT.

In addition to the impairments introduced by the channel emulator(s), each antenna may be positioned to communicate with the DUT at a different angle of arrival. The array of antennas may be two or three dimensional and are generally disposed about a test volume where the DUT is located.

In some embodiments, each antenna 12 in a boundary array system is connected directly (i.e., with a very short cable) to a broadband radio transmitter, receiver, or transceiver capable of generating and/or receiving broadband signals in a desired frequency range. The desired communication signals are aggregated in a low loss or lossless manner to the other end of the communication link, which may be one or more wireless communication testers 68 or reference radios, an integrated digital emulation of said testers/radios, or even one or more additional boundary arrays containing another over-the-air radio communication device.

Thus, when reference is made herein to a wireless communication tester or communication tester, it will be understood by persons of ordinary skill in the art that such tester is merely representative of a tester, a reference radio, a digitally emulated radio or another boundary array containing an over-the-air radio communication device. The wireless communication tester is capable of sending and receiving communication signals that, in some embodiments, are according to a communications protocol that is used by the DUT, such as for example a Wi-Fi communication protocol or a 3GPP Long Term Evolution (LTE) protocol.

In some embodiments, the RF up-conversion and down conversion segments of the associated inputs and outputs of a traditional RF channel emulator are moved to independently powered modules within the test chamber and may be attached directly to antennas with, for example, short RF cables. The power control and associated circuitry may now be applied directly at the antenna ports, while the baseband/digital conversion and emulation may remain at a centralized location.

Figure 7:
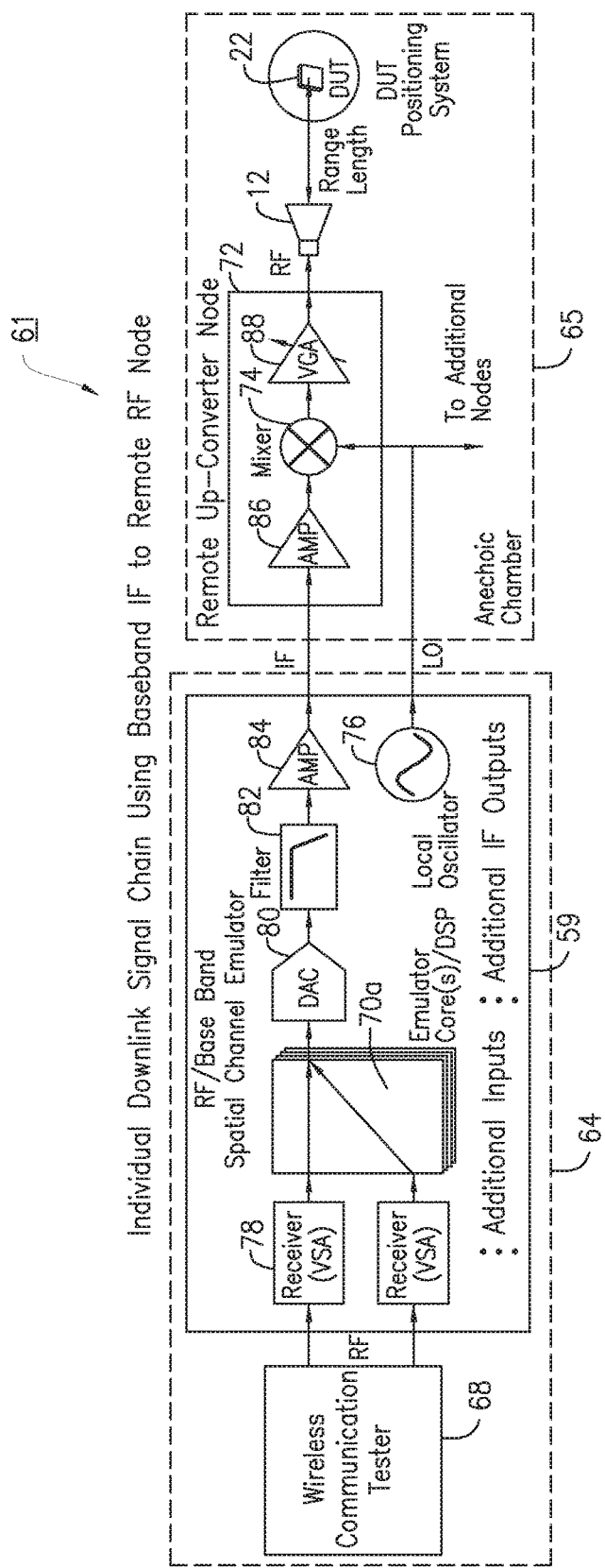
FIG. 7 is a block diagram of a distributed channel emulation system for downlink signaling.

FIG. 7 is a block diagram of distributed spatial channel emulation system 61 applied to an anechoic chamber. At a central location 64, an RF/baseband spatial channel emulator portion 59 has a channel emulator core 70a that is configured to introduce impairments in each of at least one transmit signal received from the wireless communication tester to produce at least one impaired signal for each of at least one emulated channel. Each transmit signal may be affected by a different set of impairments. This enables the test operator to emulate any one or more of a plurality of different channel models that may include multipath fading and Doppler shift. At a remote location 65, such as in an anechoic chamber, for each of at least one emulated channel, an up-converter 72 is configured to mix, in a mixer 74, a local oscillator, LO, signal from an LO 76, with an impaired signal of the emulated channel to produce a radio frequency, RF, signal. Note that the local oscillator may be replaced by a frequency synthesizer clocked by a reference signal such as a 10 mega-Hertz reference signal. Thus, embodiments are not limited to the particular up-conversion circuit shown in FIG. 7.

Note that although an anechoic chamber is shown as the remote location 65, the remote location 65 may be another type of chamber, such as a reverberation chamber, or may not be a chamber at all. Further, the emulator core 70 may be completely flexible to enable a test operator to emulate any set of channel conditions including multipath fading and Doppler shifting.

In more detail, FIG. 7 shows a wireless communication tester 68 at the central location 64 coupled to emulator receivers 78 which are in turn coupled to the emulator core 70a. The emulator receiver 78 may down convert the RF signals received from the wireless communications tester 68 and convert the down-converted signals to a digital form. The emulator core 70a may introduce impairments to one or more of the digital signals from the emulator receivers 78 and sums the impaired signals to produce a single composite impaired signal for each one of a plurality of emulated channels. The impairments introduced to the signals from the emulator receivers 78 may enable a test operator to emulate any type of channel model.

Figure 5:
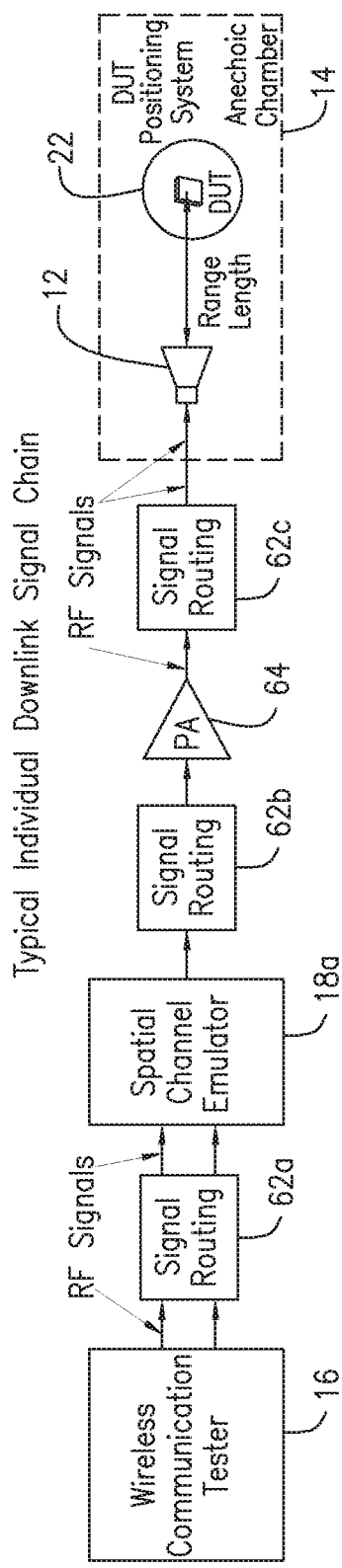
FIG. 5 is a single emulated downlink channel between a wireless communication tester and a DUT.
Figure 6:
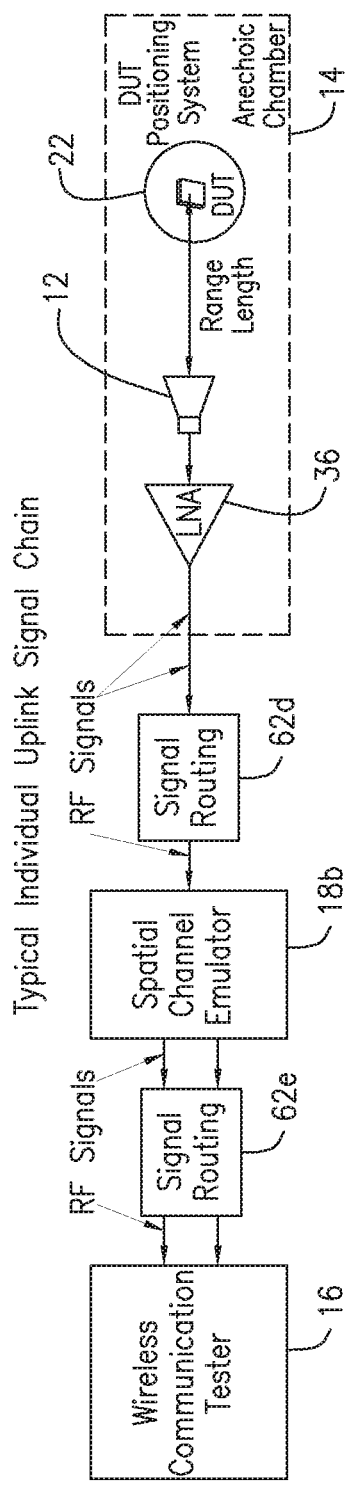
FIG. 6 is a single emulated uplink channel between a DUT and a wireless communication tester.

For each emulated channel, an output of an emulator core 70a may be converted from a digital signal to an analog signal by a digital to analog converter (DAC) 80. The output of the DAC 80 may be at an intermediate frequency (IF) or at baseband. The output of the DAC 80 may be filtered by a filter 82 and amplified by an amplifier 84. The IF or baseband signal from the amplifier 84 is transported to the remote location via a cable, for example. Since, the signal is at a relatively low intermediate frequency or at baseband, signal losses on the cable are much smaller than if the signal to be carried were at the desired test frequency, which is the case in conventional systems, as described with reference to FIGS. 1, 5 and 6.

At the remote location 65, the IF or baseband signal is received and amplified by the amplifier 86 and input to the mixer 74 for mixing with the LO signal to produce an RF signal output. For simplicity, a basic up-conversion circuit is shown in FIG. 7. Persons of ordinary skill in the art will recognize that different circuits may be implemented to achieve up-conversion of the IF or baseband signal to RF, and that embodiments are not limited to the particular up-conversion circuit shown in FIG. 7. For example, the local oscillator 76 may be replaced by a synthesizer clocked by a reference signal such as a 10 MHz reference signal. Alternately, the mixer circuit may also include a frequency multiplier (not shown) that multiplies a lower frequency LO to a higher frequency signal to be applied to the mixer 74. Note that the LO signal may be generated at the remote location or at the central location. The RF signal may be amplified by a variable gain amplifier 88, which may be implemented as a series connection of a fixed gain amplifier and an attenuator, for example. The RF signal from the amplifier 88 is fed to the antenna 12 which radiates the RF signal to the DUT 22.

Thus, some embodiments include a distributed channel emulation system 61. The distributed channel emulation system includes, at a central location 64, an emulator core configured to introduce an impairment in each of at least one transmit signal to produce at least one impaired signal for each of at least one emulated channel. At a remote location 65, for each of at the least one emulated channel, an up-converter is configured to up-convert an impaired signal of the emulated channel to produce a radio frequency (RF) signal. A signal path to transport an impaired signal from the central location 64 to the remote location 65 may be a cable, for example.

In some embodiments, an electromagnetic measurement system to perform radio frequency, RF, testing of a device under test, DUT, in a chamber is provided, as shown in FIG. 7. In these embodiments, exterior to the chamber, an emulator core 70a is configured to introduce impairments in each of at least one transmit signal to produce at least one impaired signal for each of at least one emulated channel. Within the chamber, for each of the at least one emulated channel, an up-converter 72 is configured to receive a local oscillator, LO, signal and to mix the LO signal with an impaired signal of the emulated channel to produce a radio frequency, RF, signal. In one embodiment, there may be one antenna for each emulated channel to receive the RF signal and radiate the RF signal to the DUT 22. The chamber at the remote location may be an anechoic chamber or a reverberation chamber, for example.

It is understood that persons of ordinary skill in the art will know that an anechoic chamber includes RF absorber on the walls, floor and ceiling of the chamber to absorb RF energy, and know that a reverberation chamber includes bare reflective shield walls, floor and ceiling. Other chambers may be partially lined with absorber. As noted above, the impairment introduced into a signal by the emulator core may include an amplitude weighting, a temporal shift or other impairment.

Figure 8:
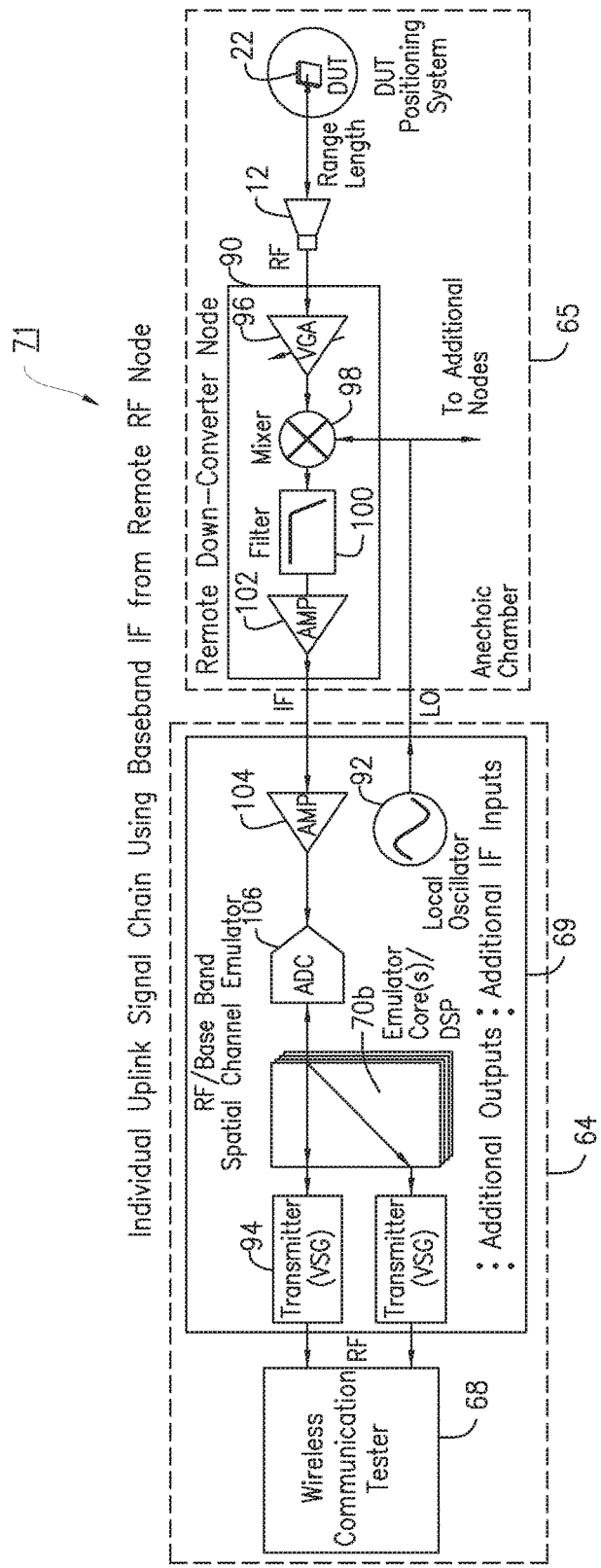
FIG. 8 is a block diagram of a distributed channel emulation system for uplink signaling.

FIG. 8 is a block diagram of a distributed channel emulation system 71 for uplink signaling applied to an anechoic chamber which includes, at a remote location 65, for each of at least one emulated channel, a down converter 90 configured to mix a local oscillator, LO, signal from an LO 92 with an RF signal to produce a down-converted signal for the emulated channel. As noted above with respect to FIG. 7, the LO 92 may be replaced by a frequency synthesizer clocked by a reference signal or other known method of generating a signal to be applied to the down converter 90 to down convert the received RF signal. The LO 92 may be located at the central location or at the remote location. For example, in some embodiments, the LO signal from the LO at the central location may be carried to the remote location on a same cable that carries the IF from the remote location to the central location, where the IF and LO signals may be separated and combined by an optional diplexer, for example. At a central location 64, an RF/baseband spatial channel emulator portion 69 has an emulator core 70*b* that introduce impairments in replicas of each of at least one down converted signal received from the remote location 65 to produce at least one impaired receive signal.

The impaired receive signals may be coupled to emulator transmitters 94, which up-convert the impaired signals to RF and transmit the impaired received signals to a wireless communication tester 68. Note that although FIG. 8 shows a distributed channel emulation system applied to an anechoic chamber, in some embodiments, the remote location 65 is a reverberation chamber, or may not be a chamber at all.

In more detail, FIG. 8 shows that an antenna 12 receives an electromagnetic signal (radio waves) from the DUT 22 and couples the received RF signal to an amplifier 96 which may be a low noise amplifier (LNA) and/or a variable gain amplifier (VGA). The output of the amplifier 96 is down-converted to an intermediate frequency (IF) or baseband. To achieve this, the RF signal may be fed to a mixer 98 which mixes the RF signal with an LO signal from the LO 92, to produce a signal which is at an intermediate frequency (IF) or at baseband. This signal is optionally filtered by a filter 100 and further amplified by an amplifier 102 before being transmitted to the central location. Since the signal is at IF or baseband, losses arising from transmitting the signal between the remote location 65 and the central location 64 are lower than for the conventional systems of FIGS. 1, 5 and 6. At the central location 64, the IF or baseband signal from the remote location 65 may be amplified by an amplifier 104 and fed to an analog to digital converter 106 which outputs a digital signal to the emulator core 70*b*.

The emulator core 70*b* introduces impairments to replicas of the down converted digital signal received from the analog to digital converter (ADC) 106 to produce output signals to the emulator transmitters 94. That is, the down-converted signal received from the ADC 106 may be replicated by the emulator core 70*b* and each replica may be impaired with different one or more impairments. Note that the corresponding signals from a plurality of remote nodes 90 are independently impaired in the channel emulator core(s) and the resulting signals are summed prior to input of the combined signals to the transmitter 94.

Thus, in some embodiments, a distributed channel emulation system 71 is provided. At a remote location 65, for each of at least one emulated channel, a down converter is configured to mix a local oscillator, LO, signal with an RF signal to produce a down-converted signal for the emulated channel. At a central location 64, an emulator core 70*b* is configured to introduce an impairment in each of at least one down converted signal received from the at least one emulated channel to produce at least one impaired receive signal. At the central location, a communication tester may be provided and configured to process the at least one impaired receive signal.

In some embodiments, an electromagnetic measurement system to test a device under test, DUT in a chamber is provided. Within the chamber, for each of at least one emulated channel, a down-converter 90 is configured to mix a local oscillator, LO, signal with an RF signal received via an antenna from the DUT to produce a down-converted signal for the emulated channel. Exterior to the chamber, an emulator core 70*b* is configured to introduce impairments in replicas of at least one down converted signal received from the at least one emulated channel to produce at least one impaired receive signal. The chamber at the remote location 65 may be an anechoic chamber or a reverberation chamber, for example.

Note that by moving power amplification directly to the antennas 12, as shown in FIGS. 7 and 8, the same amount of peak power will produce a much stronger signal at the DUT 22. Conversely, by moving the receive amplification and down conversion to be near the antenna, the receiver sensitivity is greatly improved. By designing the RF inputs and outputs for the expected over-the-air path loss conditions rather than for conducted testing, the desired amplification can be built directly into the radio at the remote location. Also, since power control may be maintained through varying the gain of the amplification, any non-linearities in the amplification stage is automatically included in the calibration of the transmitter/receiver configuration and does not introduce additional uncertainties outside the calibrated instruments.

By moving the up and down conversion to the remote location, the high losses associated with a long RF cable path can be replaced with lower loss IF and LO paths. This can also be applied using existing RF channel emulators to produce communication test frequencies at much higher frequencies than those traditionally supported by these instruments. Thus, for example, an output of the channel emulator of 6 giga-Hertz can be up-converted at the remote location to 60 GHz.

Figure 9:
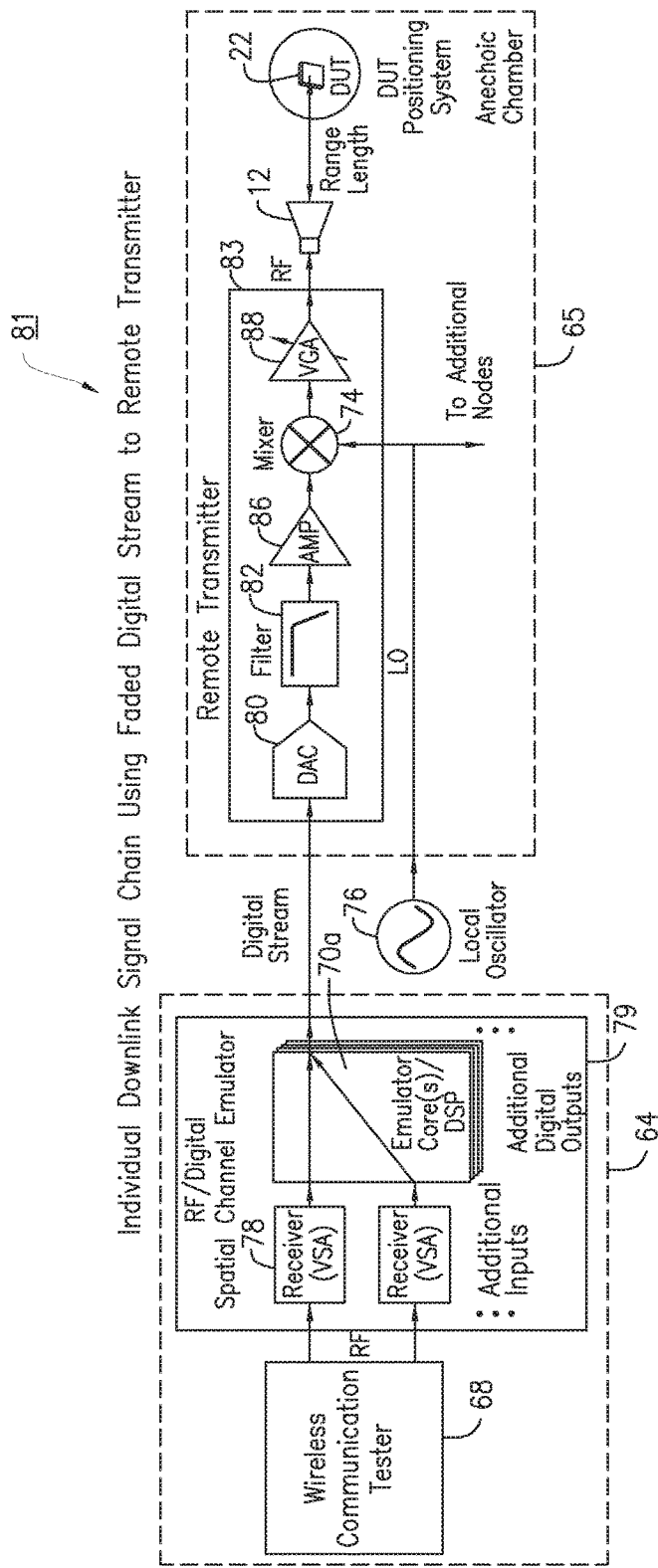
FIG. 9 is a block diagram of an alternative embodiment of a distributed channel emulation system for downlink transmissions.

FIG. 9 is a block diagram of an alternative embodiment of a distributed channel emulation system 81 for downlink transmissions to a DUT in an anechoic chamber. In this embodiment, the emulator core 70*a* is located in an RF to digital spatial channel emulator portion 79 at a central location 64 and outputs a digital stream for each emulated channel. The DAC 80 is at the remote location 65 in a remote transmitter 83 operating as a vector signal generator. Thus, in this embodiment, at least one transmit signal is generated at the wireless communication tester 68. The transmit signals from the wireless communication tester 68 are coupled to emulator receivers 78 at the central location. The emulator receivers 78 couple the transmit signals to the emulator core 70*a*, which introduces impairments in the transmit signals. Such impairments may include amplitude weighting and time shifting of each of the transmit signals.

The output of the emulator core 70*a* is a digital stream that is transported to the digital to analog converter (DAC) 80 in the remote location, which in the example of FIG. 9, is the anechoic chamber. The output of the DAC 80 is an analog signal that may be filtered by the filter 82 and amplified by the amplifier 86. The amplified, filtered analog signal is mixed in the mixer 74 with an LO signal from an LO 76 to up-convert the signal to an RF signal, that is amplified by an amplifier 88, and transmitted to the antenna 12. The antenna 12 radiates the RF signal to the DUT 22. Persons of ordinary skill in the art will recognized that variations of the circuit 83 may be implemented to achieve digital to analog conversion, up-conversion and amplification. Embodiments are not limited to the example circuit shown in FIG. 9. Further, the LO 76 may be replaced by a direct frequency synthesizer clocked by a reference signal. In some embodiments, the LO signal from the LO 76 may itself be up-converted by multiplication to a higher frequency signal before being applied to the mixer 74.

Thus, in some embodiments, a distributed channel emulation system 81 is provided that has an emulator core 70a in a central location 64 and, for each of at least one emulated channel, a signal generator in a remote location 65. In other words, in this embodiment, the emulator core is at the central location 64 and the emulator transmitter 83 is at the remote location 65.

Figure 10:
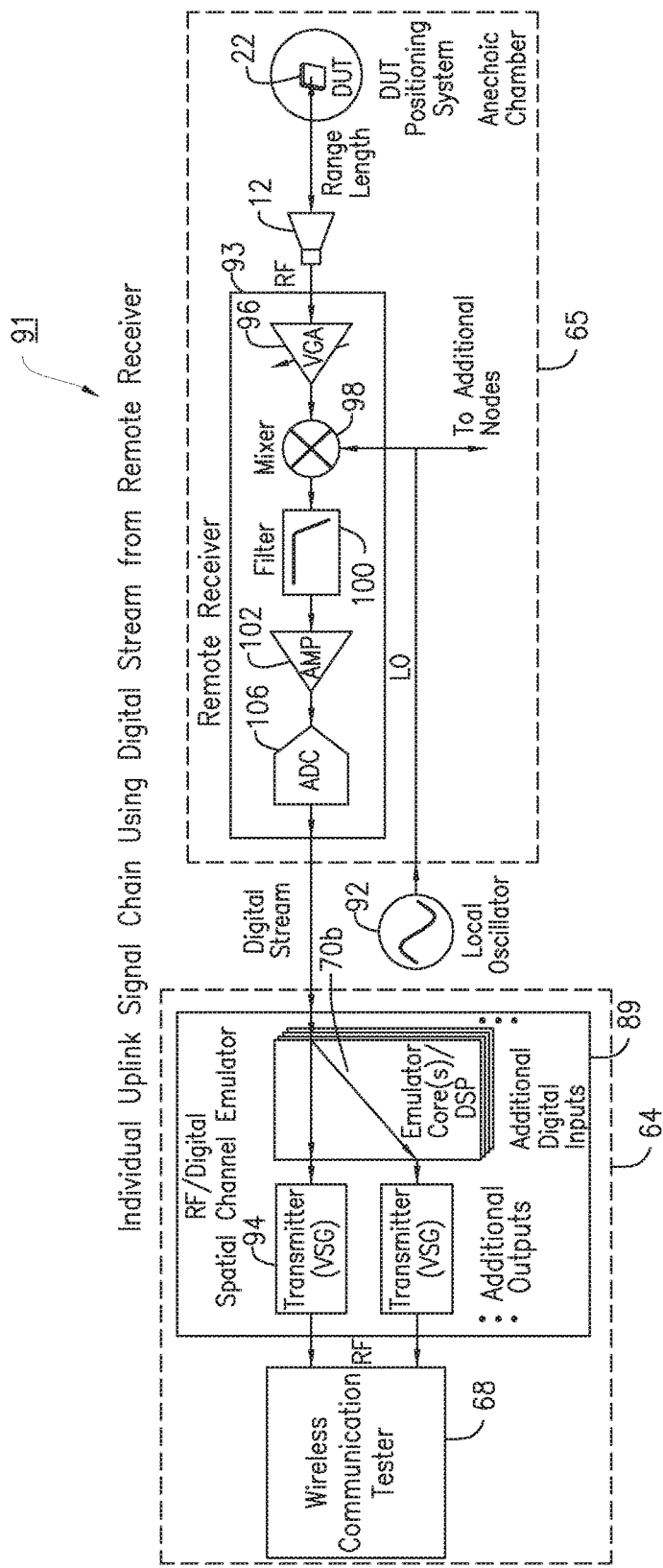
FIG. 10 is a block diagram of an alternative embodiment of a distributed channel emulation system for uplink transmissions.

FIG. 10 is a block diagram of an alternative embodiment of a distributed channel emulation system 91 for uplink transmissions from a DUT in an anechoic chamber 14. This embodiment is similar to the embodiment of FIG. 8, with the difference being that the ADC 106 is located at the remote location 65 in a remote receiver 93. Thus, an RF signal from the DUT 22 is received by the antenna 12 and amplified by the amplifier 96. The amplified RF signal is mixed in a mixer 98 with an LO signal from the LO 92 to produce a down converted analog signal for the emulated channel. This signal is filtered by the filter 100 and amplified by the amplifier 102. The filtered amplified signal is converted to a digital signal by the ADC 106 to produce a digital signal for the emulated channel. Persons of ordinary skill in the art will recognized that variations of the circuit 93 may be implemented to achieve analog to digital conversion, down-conversion and amplification. Embodiments are not limited to the example circuit shown in FIG. 10. Further, the LO 92 may be replaced by a direct frequency synthesizer clocked by a reference signal. In some embodiments, the LO signal from the LO 92 may itself be up-converted to a higher frequency signal before being applied to the mixer 98.

The digital signal is transmitted to the emulator core 70b located in an RF digital spatial channel emulator portion 89 at the central location 64 where it may be replicated. The digital signal and its replicated signals are each impaired and distributed to a plurality of emulator transmitters 94. The impairments may include amplitude weights and time shifting. The emulator transmitters 94 transmit the impaired signals to the wireless communication tester 68. Note that the corresponding signals from a plurality of remote nodes 93 are independently impaired in the channel emulator core(s) and the resulting signals are summed prior to input of the combined signals to the transmitter 94.

Thus, in some embodiments, a distributed channel emulation system 81 is provided that has an emulator core 70a in a central location 64 and, for each of at least one emulated channel, a signal transmitter 83 in a remote location 65. In other words, in this embodiment, the emulator core is at the central location 64 and the emulator receiver 83 is at the remote location 65.

In the embodiments of FIGS. 9 and 10, the entire analog radio (DAC, up-converter and power amplifier for the downlink, and DAC, down-converter and low noise amplifier for the uplink) is located remote from the central location 64 and the emulator core 70 is located at the central location 64. Communication between the central digital emulation and the digital-to-analog or analog-to-digital converters (DAC/ADC) of the transmitter and receiver is all done digitally, and only a centralized reference signal (e.g., 10 MHz) or LO signal may be used to keep all of the distributed radios in a proper phase-locked condition and control the operating frequency(ies). Note that a different LO can be used for the uplink and the downlink.

The distributed radios are essentially vector signal generators or analyzers capable of converting any digital waveform into the desired RF signal and vice-versa. The digital signal transferred to the distributed radio in the uplink contains the digital representation of the combined RF signals that would come from all of the inputs from the wireless communication tester for each path to the particular antenna within the chamber. Likewise, the signal received on that antenna is digitized and returned to the channel emulator core in the uplink.

Note that the communication between the distributed components in the remote location with the remainder of emulation components at the central location may be at IF or baseband, where the losses between components can be much less than the RF path loss of typical cables. Also, in the uplink configurations, the amplifier 96 being coupled directly to the antenna, minimizes or eliminates the need for additional low noise amplification.

Note that although each of the FIGS. 7-10 show only one direction, uplink or downlink, it is understood that persons of ordinary skill in the art will be able to implement both directions simultaneously using isolation circuitry between the antenna 12 and the respective up-converters and down-converters. Such isolation circuitry may include a diplexer, isolator, or even separate transmit and receive antennas. The particular isolation circuitry may depend upon the type of communication protocol being tested. For example, Wi-Fi may call for one type of isolation circuitry, whereas LTE may call for a different type of isolation circuitry.

Control signals between the central channel emulator core 70a, 70b and the individual transmitters or receivers at the remote location 65 can be provided by separate digital means such as cables or optical fibers, or even on the cable that carries the baseband or IF digital signal to or from the remote radio modules. Also, power for operating the remote transmitters and receivers may be applied locally at each radio or carried on the IF- or LO-carrying cables.

Figure 11:
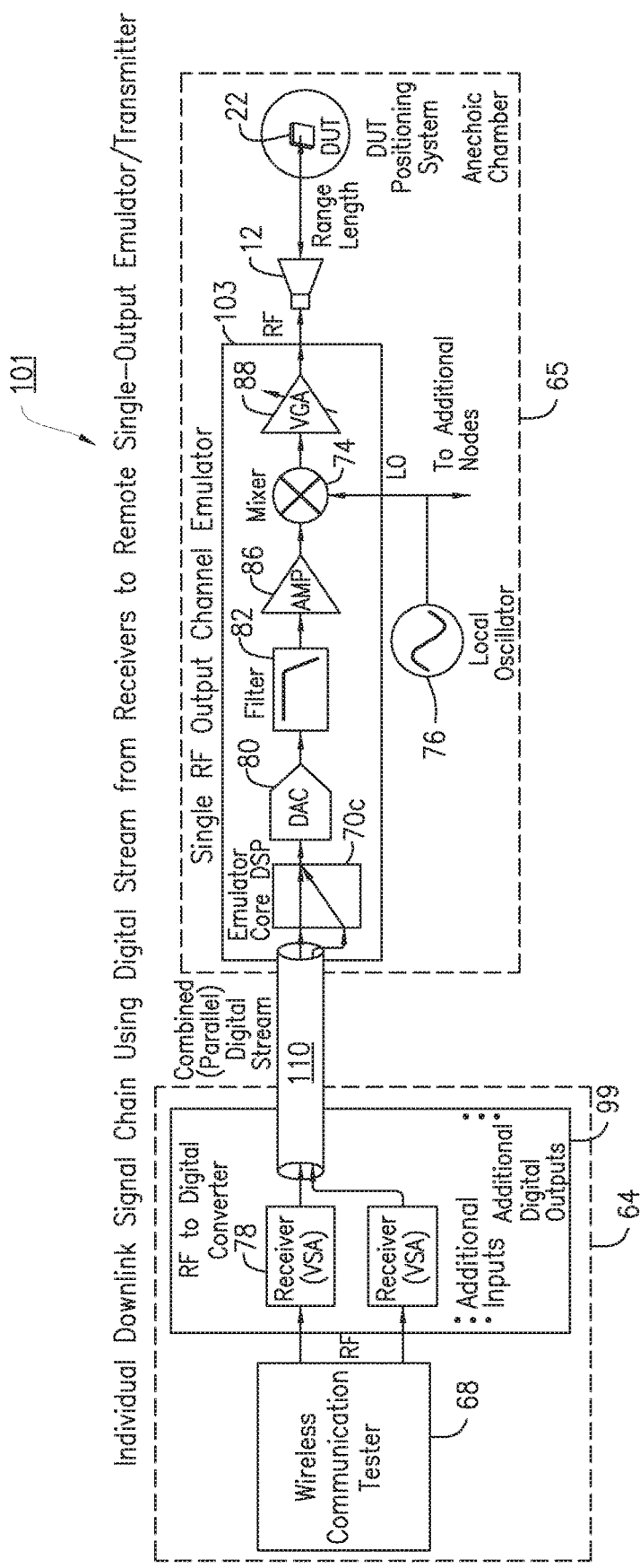
FIG. 11 is a block diagram of an embodiment of a distributed channel emulation system for downlink transmissions.

FIG. 11 is a block diagram of an embodiment of a distributed channel emulation system 101 having, at a central location 64, emulator receivers 78 within an RF to digital converter portion 99, and at a remote location 65, for each emulated channel, an emulator core 70c, DAC 80 and up-converter. Thus, in this embodiment, a signal carrier 110 such as a cable, carries digital signals from the plurality of emulator receivers 78 at the central location to a least one emulator core 70c of an RF output channel emulator portion 103. The signal carrier 110 may be a single cable or a plurality of cables. The output of the emulated core 70c is an impaired signal which is a combination of impaired signals from the plurality of emulator receivers 78. The impairments can include amplitude weights and/or time-shifts and/or other impairments.

The output of an emulator core 70c is input to the transmitter chain including DAC 80, filter 82, amplifier 86, mixer 74 and VGA 88, which operates as described above with reference to FIG. 9. The up-converted amplified signal output by the VGA 88 is coupled to the antenna 12, which radiates the RF signal to the DUT 22.

Thus, in some embodiments, a distributed channel emulation system 101 is provided that has at least one emulator receiver 78 in a central location 64 and, for each of at least one emulated channel, an emulator core 70c, a DAC and up-converter in a remote location 65.

Figure 12:
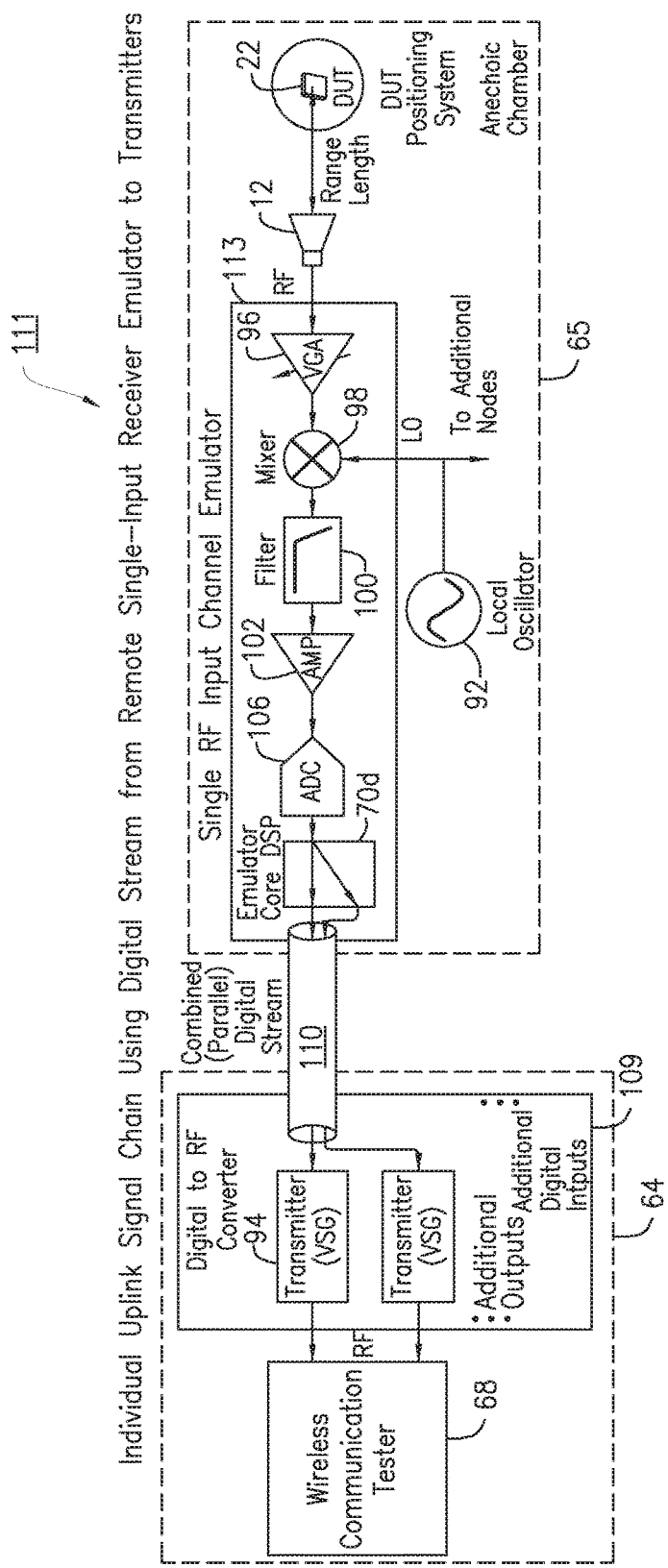
FIG. 12 is a block diagram of an embodiment of a distributed channel emulation system for uplink transmissions.

FIG. 12 is a block diagram of an embodiment of a distributed channel emulation system 111 having, at a central location 64, emulator transmitters 94 in a digital to RF converter portion 109, and at a remote location 65, for each emulated channel, an emulator core 70*d* of an RF input channel emulator portion 113. In this embodiment, a signal carrier 110 such as a cable, carries digital signals from the plurality of emulator cores 70*d* at the remote location to a plurality of emulator transmitters 94. Note that the corresponding signals from a plurality of remote nodes 113 are independently impaired in the channel emulator core(s) and the resulting signals are summed prior to input of the combined signals to the transmitter 94.

In operation, for each emulated channel, an RF signal is received from an antenna 12, and amplified by the amplifier 96. The amplified RF signal from amplifier 96 is down-converted by mixing it with a LO signal from the LO 92 in the mixer 98. The down-converted signal is filtered by the filter 100, amplified by the amplifier 102 and converted from analog to digital form by ADC 106. The digital signal output by ADC 106 is coupled to an emulator core 70*d*. The emulator core impairs the digital signal and replications of the digital signal by impairments to produce a plurality of impaired output signals that are combined with corresponding signals from other emulator cores 70*d* (not shown) and carried by signal carrier 110 to the plurality of emulator transmitters 94 at the central location 64. These signals received from the emulator transmitters 94 are coupled to the wireless communication tester 68.

Thus, in some embodiments, a distributed channel emulation system is provided that has at least one emulator transmitter in a central location 64 and, for each of at least one emulated channel, an emulator core, an ADC and a down-converter in a remote location 65.

In the configurations of FIGS. 11 and 12, the digital signal processing components of the channel emulator are in the distributed nodes of the remote location 65, thereby giving each node ability to generate its own emulated channel between the wireless communication tester 68 and the test volume where the DUT 22 is located. The centralized portion of the channel emulator then contains only the components used to combine the digital signals and convert from digital to analog to RF for interface to the communication tester, and any centralized control and LO and/or reference signals.

Note, however, that the LO may also be produced by a single module in the remote location of the distributed system and shared among modules, eliminating the need for transfer of that signal outside the chamber in the case where it is not also used for the RF connection between the channel emulator and communication tester.

The digital communication used to transfer the real-time streaming waveform between the central location and the remote location may be carried through electrical cables specific to the chosen high speed interface (e.g. MXI-2, HSSI, custom, etc.) or fiber optic cables, thereby eliminating the RF interactions and shielding issues associated with electrical cables. In any of the above implementations, the RF connections between the communication tester and channel emulator could be replaced by baseband or IF communication or digital information transfer to the DAC or from the ADC.

Note that the embodiments of FIGS. 7 and 8 can be combined to provide a bi-directional system. Similarly, the embodiments of FIGS. 9 and 10 can be combined to provide a bi-directional system. Also, the embodiments of FIGS. 11 and 12 can be combined to provide a bi-directional system.

Figure 13:
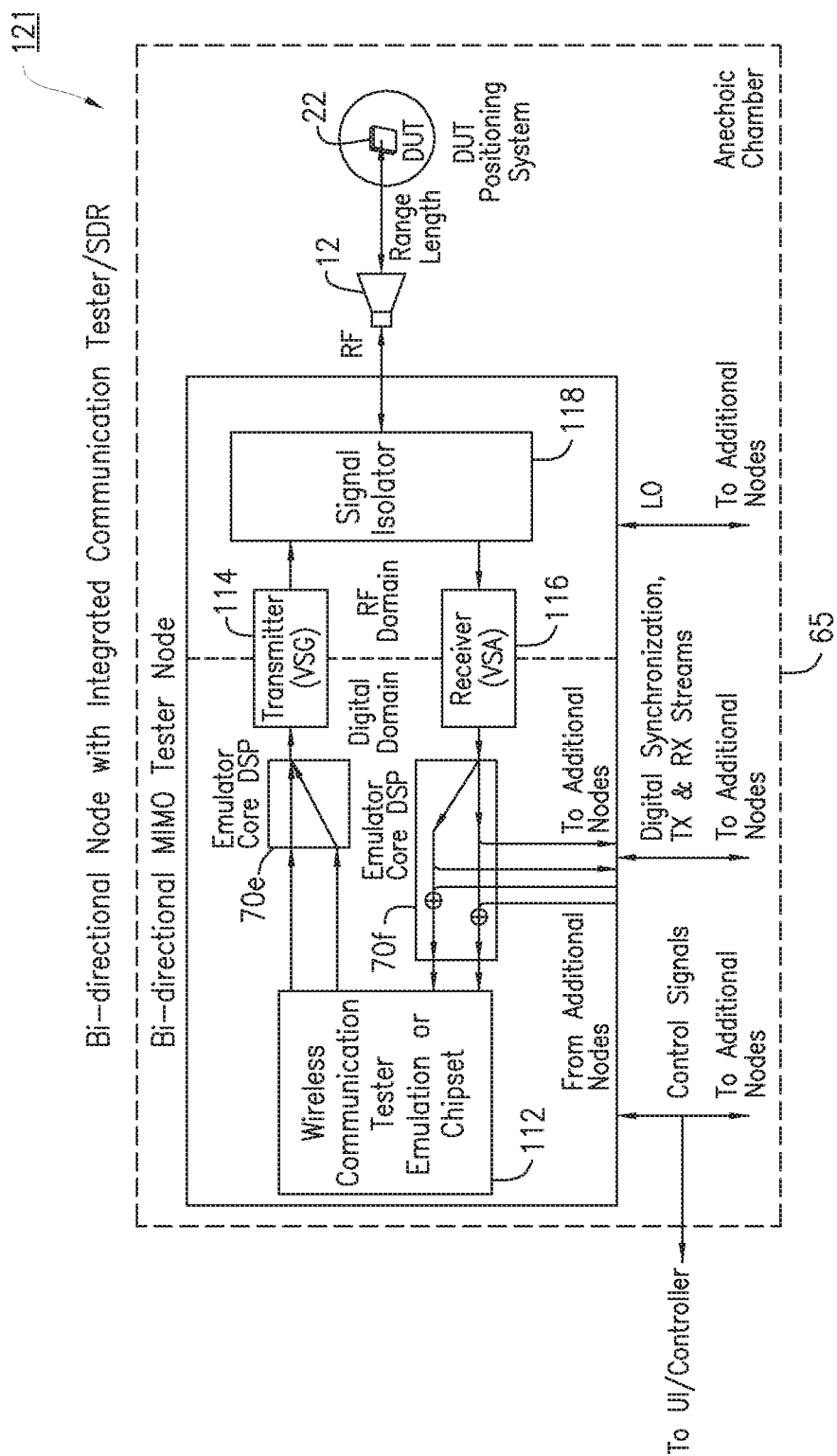
FIG. 13 a block diagram of a bi-directional node for channel emulation on the downlink and the uplink.

FIG. 13 is a block diagram of a bi-directional node 121 for channel emulation on the downlink and the uplink, all contained within a remote location 65, such as an anechoic chamber 14. A software-defined or chipset-based communication tester 112 provides transmit signals for the downlink and receives output signals for the uplink. The transmit signals from the communication tester 112 are coupled to an emulator core 70*e* which introduces an impairment to replicas of at least one of the transmit signals to produce an impaired signal for an emulated channel.

The impaired signal from the emulator core 70*e* is a digital signal that is coupled to the transmitter 114, where the digital signal is converted to analog, up-converted to RF and amplified. The amplified RF signal from the transmitter 114 is sent to a signal isolator 118 which couples the amplified RF signal to the antenna 12 while preventing the amplified RF signal from entering the receiver 116 of the uplink path. The antenna 12 radiates the RF signal to the DUT 22. Note that the type of signal isolator 118 may depend on the communication protocol of the DUT 22. Note also that the communication tester 112 may produce digital communication signals at base band rather than producing RF signals as in conventional wireless communication testers. Accordingly, the communication tester 112 need not include RF components such as an RF isolator between the transmit and receive ports of the communication tester.

On the uplink, the antenna 12 receives an RF signal from the DUT 22 and couples the received RF signal to the isolator 118. The isolator 118 couples the received RF signal to the receiver 116 while preventing the received RF signal from entering the transmitter 114. The receiver 116 amplifies and down-converts the received RF signal, and converts the down-converted signal to digital form. The output of the receiver 116 is coupled to an emulator core 70*f*. The emulator core 70*f* impairs the signal received from the receiver 116 and may also produce and impair replications of this signal, to produce at least one impaired signal that is coupled to the communication tester 112.

As shown in FIG. 13, in some embodiments, the impaired signals from the emulator core may be transmitted to the communication tester and also sent to additional nodes identical to the node of FIG. 13 to be combined with the impaired signals from the emulators of those additional nodes. Likewise, the impaired signals from the additional nodes are received by the node of FIG. 13 and added to the signals from the emulator core 70*f* of FIG. 13. Also synchronization signals are coupled to the node of FIG. 13 and to the additional nodes to ensure that the signals generated by the communication testers in each node have the same content and timing. Also, control signals received from a user interface and controller are distributed to the node of FIG. 13 and additional nodes to enable a user to control the communication testers of the nodes.

Figure 14:
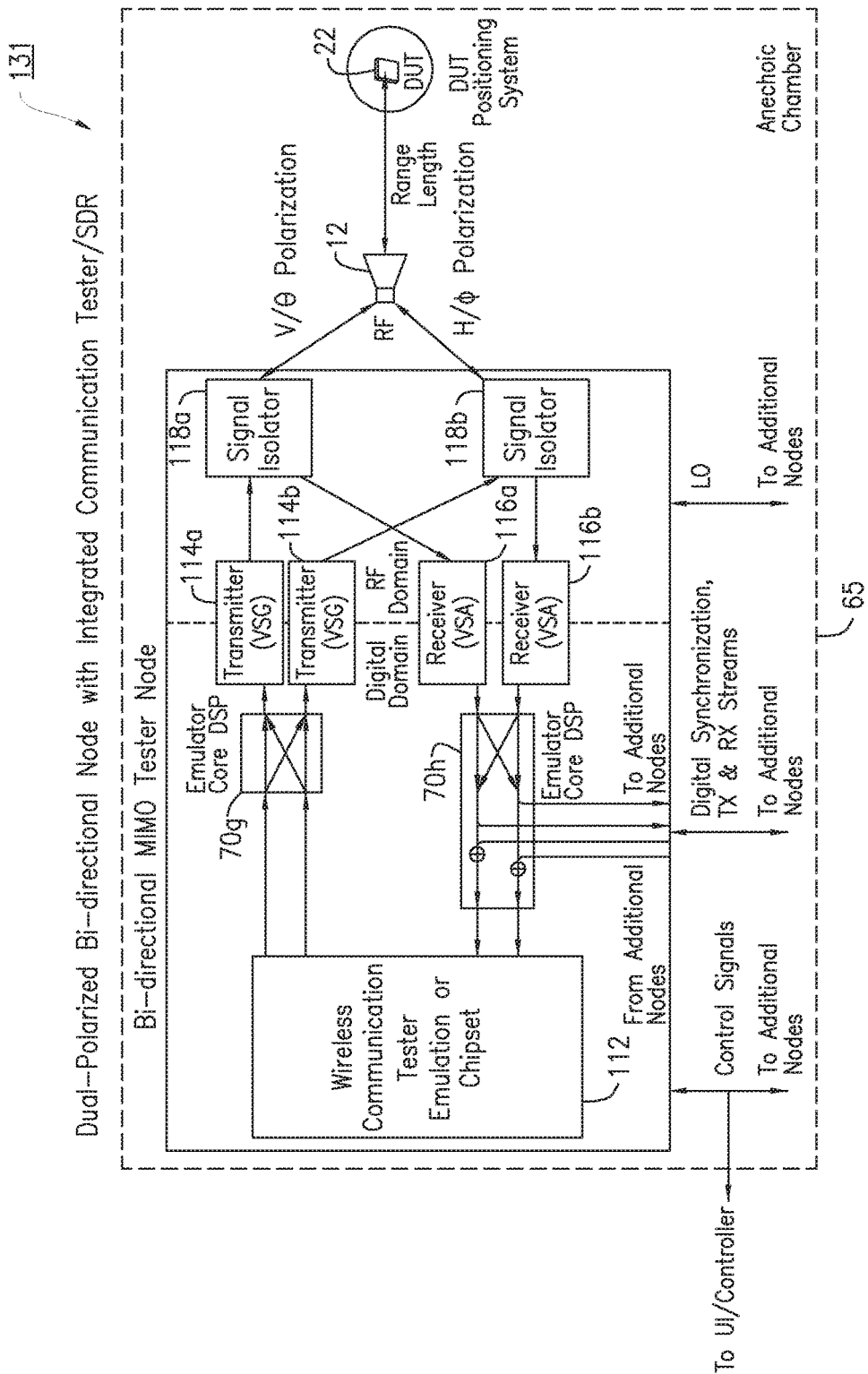
FIG. 14 is a block diagram of a bi-directional dual polarization system for channel emulation on the downlink and the uplink.

FIG. 14 is a block diagram of a bi-directional dual polarization system for channel emulation on the downlink and the uplink, all contained within a remote location 65, such as an anechoic chamber. The software defined or chipset based wireless communication tester 112 provides transmit signals to the emulator core for the downlink and receives output signals from the emulator core for the uplink. The transmit signals from the wireless communication tester 112 are coupled to an emulator core 70*g* which may introduce an impairment to each of two transmit signals to produce two signals for two emulated channels, each channel corresponding to a different polarization. In other words, each of the two signals corresponds to one of two polarizations which may be orthogonal.

Each of the two signals are fed to one of two transmitters 114*a* and 114*b*. Each transmitter converts the signal it receives to analog form, up-converts the signal to RF and couples the RF signal to one of two isolators 118*a* and 118*b*.

The signal isolator 118a transmits the RF signal it receives to a vertical polarized antenna element of the antenna 12. The signal isolator 118b transmits the RF signal it receives to a horizontal polarized antenna element of the antenna 12. Persons of ordinary skill in the art will recognize that vertical and horizontal polarizations are but examples of different polarizations that can be transmitted.

For the uplink, each of two orthogonally polarized antenna elements of antenna element 12 couple RF signals received from the DUT 22 to isolators 118a and 118b. Isolators 118a and 118b couple the received RF signals to receivers 116a and 116b. Each receiver 116 amplifies its respective received RF signal and down-converts the received RF signal to an IF signal or to a baseband signal. Each receiver has an ADC that converts its received down-converted signal to digital form. The outputs of the receivers 116 are input to an emulator core 70h which may introduce different impairments to the received signals and couples the impaired signals to the wireless communication tester 112.

As discussed above with reference to FIG. 13, the impaired signals from the emulator core 70h of the node of FIG. 14 may be combined with corresponding impaired signals from additional nodes and input to the communication tester 112. The impaired signals from the emulator core 70h of the node of FIG. 14 may also be sent to the additional nodes to be similarly combined with the impaired signals from the emulators of the additional nodes. Also synchronization signals are coupled to the node of FIG. 14 and to the additional nodes to ensure that the signals generated by the communication testers in each node have the same content and timing. Also, control signals received from a user interface and controller are distributed to the node of FIG. 14 and additional nodes to enable a user to control the communication testers of the nodes.

Thus, some embodiments provide a complete radio and channel emulator behind each antenna 12 at the remote location, capable of performing all radio communication and multipath emulation for single or dual polarization at different angles of arrival. The radio and channel emulator can be implemented entirely by software executed by a processor, such as a digital signal processor, or may be implemented in a combination of hardware, such as application specific hardware, and software.

Thus, in the implementations of FIGS. 13 and 14 the communication tester and channel emulator are merged into a single possibly software-defined, radio for a desired radio communication protocol. The desired channel emulation for the associated path to the test volume would be applied to the digital communication prior to the analog conversion on the downlink and before the decoding of the digitized signal on the uplink. Digital and LO synchronization and control signals could be shared between the distributed nodes, and a single control interface could be made back to a centralized PC or other control/user interface.

Even in the case where a chipset implementation is used to implement the communication tester or is more practical for the wireless protocol components being implemented by the communication tester, a chipset implementation would be realizable with minimal modifications to current off-the-shelf communication testers with basic fading/channel emulation capabilities. The main task is to synchronize the protocol components (software or chipsets) so that they are producing the same digital data at the same time and then apply the digital fading for each separate path to the resultant digital signal prior to converting it to RF.

On the downlink side, the digitized data is altered by the digital channel emulation prior to being received by each radio. The digitized results can be summed together and processed as a single total result. The net result is that on the downlink side, each chipset in each node would be creating the signal independently with appropriate synchronization, while on the uplink side, the digitized results from each receiver would be combined and fed to the receiver of only a single chipset to decode the received protocol with the sum of the fading effects from all of the emulated channels.

Since the distributed communication tester is really emulating a single transceiver end point, the signals should still have a common endpoint. On the transmit side, that may be as simple as configuring each node to transmit the same data and keep them synchronized. However, on the receive side, the behavior of the radio receiver depends on the total of the signals from all nodes. For fully digital implementations, some portion of the received signal processing may be done in each node prior to combining, while for a chipset based implementation, the signals should be aggregated digitally at one node and then sampled by a single chipset to process the final received signal. Alternately, multiple chipsets can sample the aggregated signal and some composite average or sum of the results of each chipset output be used to determine the final received signal.

Figure 15:
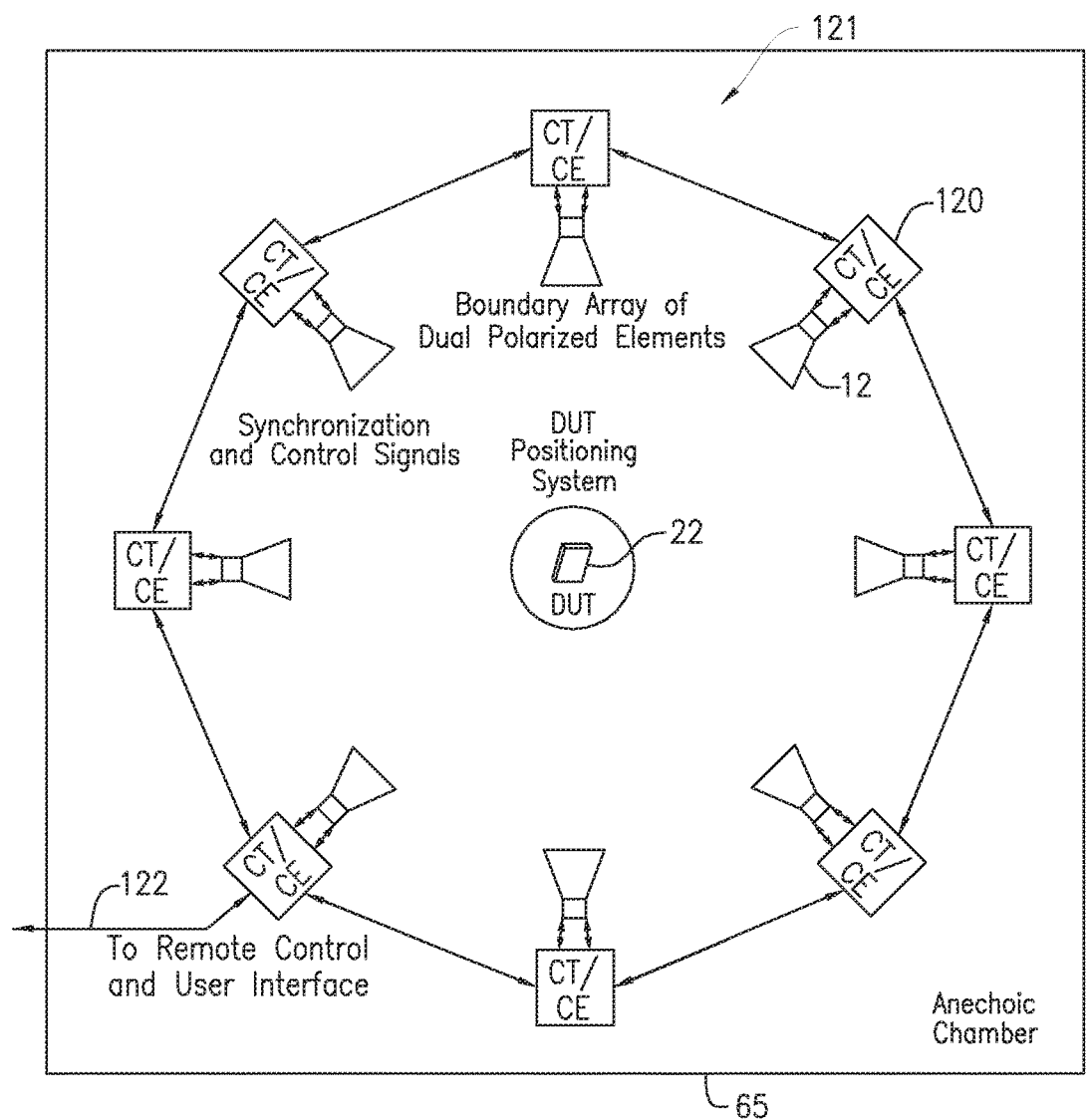
FIG. 15 is a block diagram of an anechoic chamber having a DUT and a plurality of antennas connected to multiple distributed communication tester/channel emulator nodes.

FIG. 15 is a block diagram of an example anechoic chamber having a DUT 22 and a plurality of antennas 12. Each antenna 12 may include differently polarized antenna elements. Note that the DUT 22 may be positioned on a positioning system that rotates or otherwise moves with respect to the antennas 12. Connected to each antenna 12 is a bi-directional combination 120 of a communication tester 68 and channel emulator 70. The outputs of the combinations 120, which may be baseband signals, are transported by a cable 122 in and out of the remotely located chamber to a central location that provides a user interface. Control signals to control the communication tester and channel emulator of each combination 120 may also be transported by the cable 122. Note that the configuration of combinations 120 is shown inside an anechoic chamber but in some embodiments, the combinations 120 may not be located in a chamber at all, or may be located in a reverberation chamber, for example. Note also that in some embodiments the antennas 12 may be single polarization antennas or dual polarized antennas.

By making each antenna of the boundary array into a software defined radio designed for over-the-air communication, the relatively low path loss associated with the short range lengths typically used for this testing means that the radio in each node does not require exceptional capabilities to address the associated path losses. Here, a node refers to the combination of wireless communication tester and channel emulator.

In one embodiment, the system 121 becomes one radio (the DUT) communicating with a large number of radios (the array), all simultaneously. Note that for a completely software defined implementation, the number of MIMO streams is only limited by the processing resources necessary to emulate them. In the configuration of FIG. 15, the combinations of channel emulators and communication testers may all be synchronized by a signal at the remote location or in a central location.

Note that in the embodiments above, the local oscillator (LO) may be located at a central location and distributed to the mixers at the remote location or a LO may be located in proximity of each mixer at the remote location. The LO signal may, in some embodiments, be multiplied upward before being input to a respective mixer of the remote up or down-converter, resulting in an LO frequency being well below the desired operating RF. The LO signal frequency may also be the same for different emulated channels or may be different for different emulated channels (e.g. for LTE carrier aggregation and similar approaches).

Further, the LO signal frequencies may be different on the uplink than on the downlink. As noted above, the LO signal may be coupled on the same cable that carries the up-converted or down-converted signals using a diplexer, circulator or isolator. Also, the LO signal may be a reference signal, for example, a 10 MHz reference clock, that each distributed front end converts to a target LO frequency for mixing in the respective mixer 74, 98.

Figure 16:
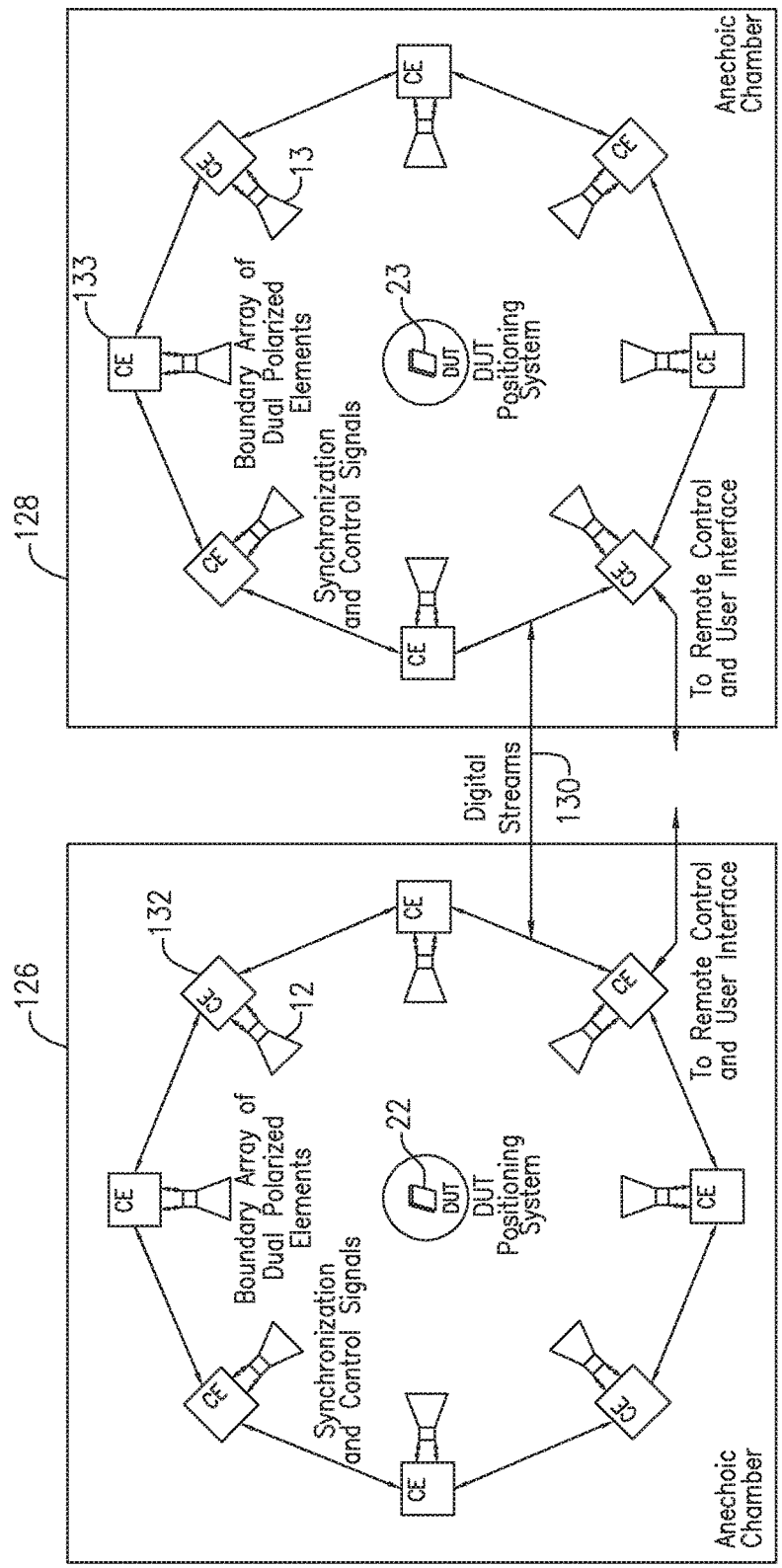
FIG. 16 is a block diagram of a dual boundary array system.

FIG. 16 is a diagram of an embodiment of a dual boundary array to emulate full spatial communication between two endpoints. The dual boundary array includes a first boundary array 126 and a second boundary array 128 connected by a digital connection 130, for example. As mentioned above, the distributed nodes on one side (or both) could be conducted connections to a reference radio or multiple devices under test where full multi-port network emulation evaluation is desired (e.g. massive MIMO). Optionally, one may implement a distributed node on one end and a centralized node on the other end, as already described above. In FIG. 16, the channel emulators 132 and 133 emulate channels by introducing impairments to their respective received or transmitted signals. For example, the DUT 22 may be a base station and the DUT 23 may be a wireless phone. In this case, on the downlink, the base station DUT 22 generates communication signals to be transmitted to the wireless phone DUT 23. On the uplink, the wireless phone DUT 23 generates communication signals to be transmitted to the base station DUT 22. On the downlink, channel emulators 132 and 133 introduce impairments to the downlink signals from the base station DUT 22 and on the uplink, channel emulators 132 and 133 introduce impairments to the uplink signals from the wireless phone DUT 23.

In some embodiments, the antennas 13 can be replaced by DUTs connected directly to the channel emulators 133. In some embodiments, both the antennas 13 and antennas 12 may be replaced by DUTs. Thus, in some embodiments, an array of individual radios (e.g. mobile handsets) may be connected to an array of individual channel emulator nodes which are in turn inter-connected with a boundary array with a DUT (e.g. a massive MIMO base station), or another array of individual nodes connected to other radios (e.g. for mesh network testing). Also, in some cases the configuration of channel emulators 132 and/or 133 may not be enclosed in an anechoic chamber when the DUTs are connected directly to the channel emulators, for example.

Thus, in some embodiments, one set of remote nodes are connected to another set of remote nodes at a different location. In some embodiments, these remote nodes may consist of up/down converter components routed through a central channel emulator. In some embodiments, the communication may be digital between nodes with transmitter and/or receiver components. In some embodiments, the remote nodes may also contain channel emulator components. In some embodiments, sets of remote nodes are directly interconnected. In some embodiments, the remote nodes are connected to antennas. In some embodiments, remote nodes are contained within a chamber. In some embodiments, some or all of the remote nodes are connected to wireless communication devices.

Figure 17:
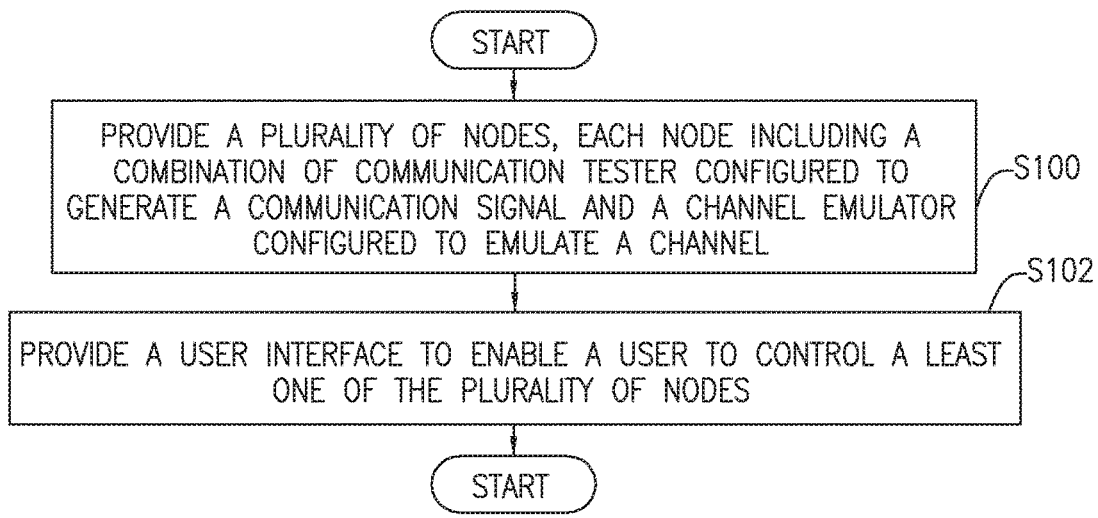
FIG. 17 is a flowchart of a first exemplary process for implementing a measurement system.

FIG. 17 is a flowchart of an exemplary process for implementing a measurement system. The process includes providing a plurality of nodes, each node including a combination of a communication tester configured to generate a communication signal and a channel emulator configured to emulate a channel (block S100). The process further includes providing a user interface configured to enable a user to control at least one of the plurality of nodes (block S102).

Figure 18:
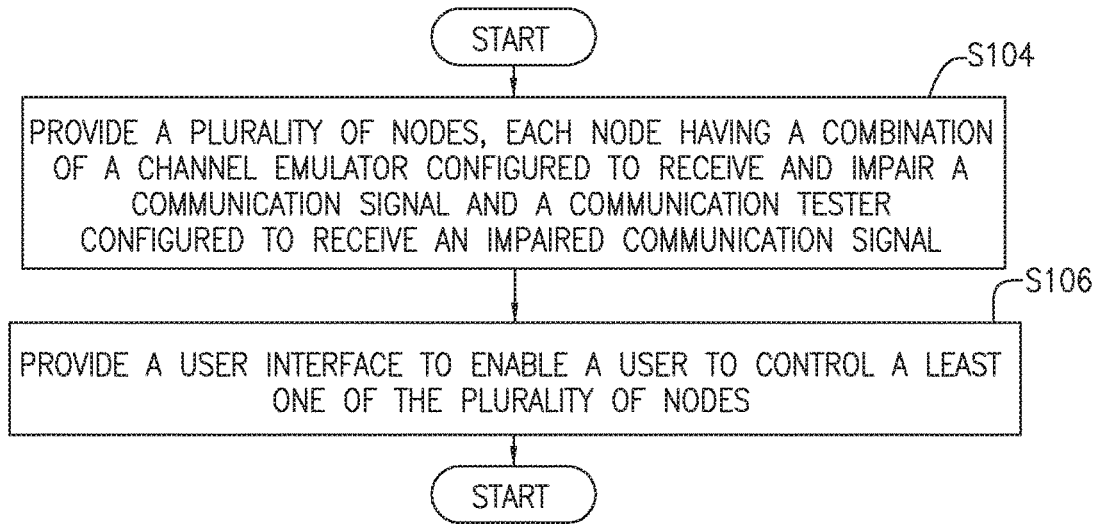
FIG. 18 is a flowchart of a second exemplary process for implementing a measurement system.

FIG. 18 is flowchart of another exemplary process for implementing a measurement system. The process includes providing a plurality of nodes, each node having a combination of a channel emulator configured to receive and impair a communication signal and a communication tester configured to receive an impaired communication signal (block S104). The process further includes providing a user interface configured to enable a user to control at least one of the plurality of nodes (block S106).

Figure 19:
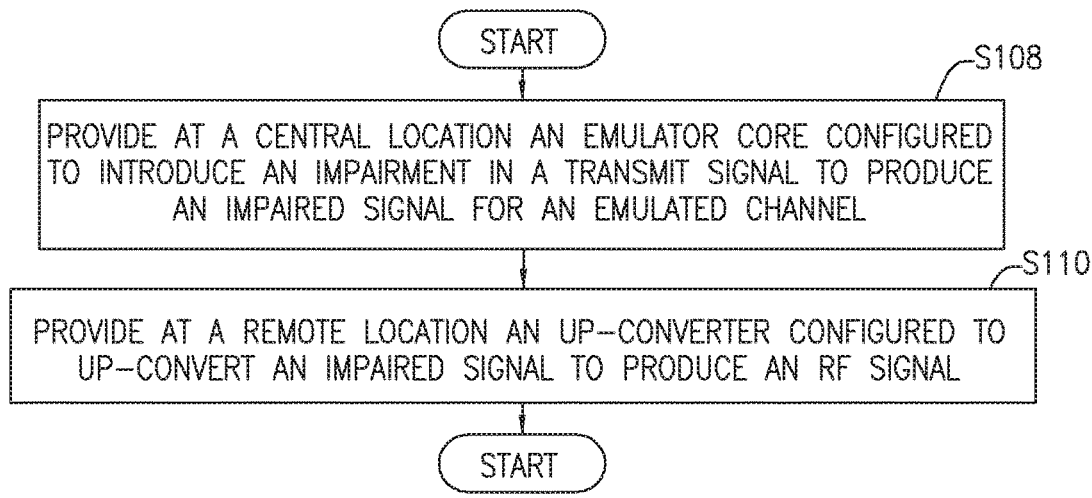
FIG. 19 is a flowchart of a third exemplary process for implementing a measurement system.

FIG. 19 is a flowchart of an exemplary process for implementing a measurement process. The process includes providing at a central location an emulator core configured to introduce an impairment in a transmit signal to produce an impaired signal for an emulated channel (block S108). The process further includes providing at a remote location, an up-converter configured to up-convert an impaired signal to produce an RF signal (block S110).

Figure 20:
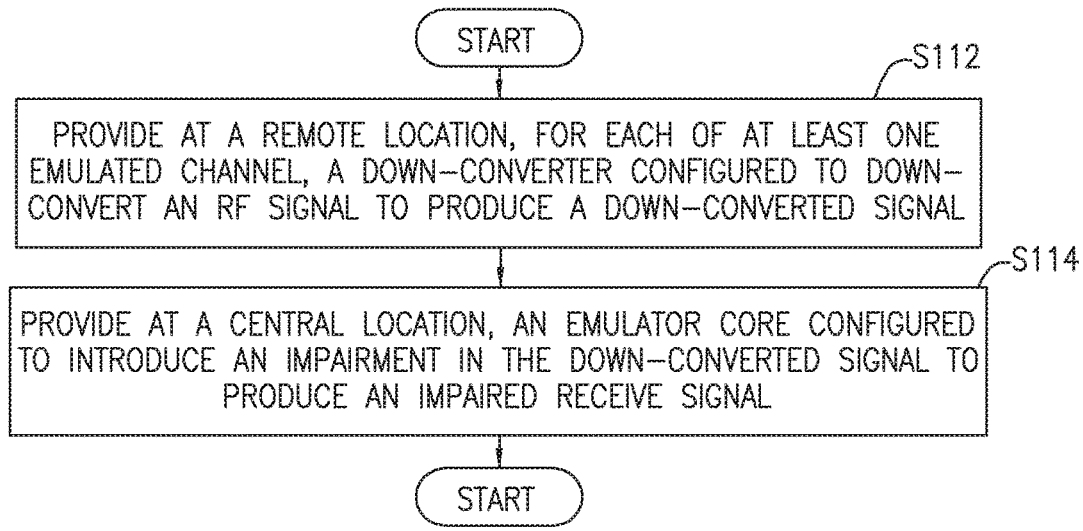
FIG. 20 is a flowchart of a fourth exemplary process for implementing a measurement system.

FIG. 20 is a flowchart of another exemplary process for implementing a measurement system. The process includes providing at a remote location, for each of at least one emulated channel, a down-converter configured to down-convert a radio frequency, RF, signal to produce a down-converted signal (block S112). The process further includes providing at a central location, an emulator core configured to introduce an impairment in the down-converted signal to produce an impaired receive signal (block S114).

Thus, some embodiments include a distributed channel emulation system implementing a downlink channel, including at a central location, an emulator core configured to introduce an impairment in each of at least one transmit signal to produce at least one impaired signal for each of at least one emulated channel. The system includes, at a remote location, for each of at the least one emulated channel, an up-converter configured to mix a local oscillator, LO, signal with an impaired signal of the emulated channel to produce a radio frequency, RF, signal.

In some embodiments, the system includes a signal path to transport at least one impaired signal from the emulator core to the up-converter at the remote location. In some embodiments, the system includes, at the central location, a communication tester configured to generate the at least one transmit signal. In some embodiments, the remote location is within a test chamber and the central location is exterior to the test chamber. In some embodiments, the system also includes, at the remote location, for each of the at least one emulated channel, a digital to analog converter to convert the impaired signal to an analog signal to be mixed with the LO signal.

In some embodiments, a distributed channel emulation system implementing an uplink channel is provided. At a remote location, for each of at least one emulated channel, a down converter is configured to mix a local oscillator, LO, signal with an RF signal to produce a down-converted signal for the emulated channel. At a central location, an emulator core is configured to introduce an impairment in each of at least one down converted signal received from the at least one emulated channel to produce at least one impaired receive signal.

In some embodiments, the system includes, between the central location and the remote location, a signal path to transport at least one impaired signal from the emulator core to the up-converter at the remote location. In some embodiments, the system includes, at the central location, a communication tester configured to process the at least one impaired receive signal. In some embodiments, the remote location is within a test chamber and the central location is exterior to the test chamber. In some embodiments, the system further includes, at the remote location, for each of the at least one emulated channel, an analog to digital converter to convert the down-converted signal to a digital signal.

In some embodiments, an electromagnetic measurement system to perform radio frequency, RF, downlink testing of a device under test, DUT, in a chamber is provided. Exterior to the chamber is an emulator core configured to introduce an impairment in each of at least one transmit signal to produce at least one impaired signal for each of at least one emulated channel. Within the chamber, for each of the at least one emulated channel, an up-converter is configured to receive a local oscillator, LO, signal and to mix the LO signal with an impaired signal of the emulated channel to produce a radio frequency, RF, signal.

In some embodiments, the system further includes, for each of the at least one emulated channel, an antenna configured to radiate the RF signal. In some embodiments, the chamber is one of an anechoic chamber and a reverberation chamber. In some embodiments, an impairment includes at least one of an amplitude weighting and a temporal shift. In some embodiments, the system includes, exterior to the chamber, for each of the at least one emulated channel, a digital to analog converter to convert an impaired signal from the emulator core from a digital form to an analog form. In some embodiments, the system includes, within the chamber, for each of the at least one emulated channel, a variable gain amplifier configured to adjustably amplify the RF signal.

In some embodiments, the impaired signal mixed with the LO signal is an intermediate frequency, IF, signal. In some embodiments, the impaired signal mixed with the LO signal is a baseband signal. In some embodiments, the system further includes, within the chamber, for each of the at least one emulated channel, a digital to analog converter, DAC, configured to convert an impaired signal from a digital form to an analog form such that the analog form of the impaired signal is mixed with the LO signal in the up-converter.

In some embodiments, an electromagnetic measurement system to perform radio frequency uplink testing of a device under test, DUT, in a chamber is provided. The system includes, within the chamber, for each of at least one emulated channel, a down-converter configured to mix a local oscillator, LO, signal with an RF signal received via an antenna from the DUT to produce a down-converted signal for the emulated channel. The system further includes, exterior to the chamber, an emulator core configured to introduce an impairment in each of at least one down converted signal received from the at least one emulated channel to produce at least one impaired receive signal.

In some embodiments, the chamber is one of an anechoic chamber and a reverberation chamber. In some embodiments, the system further includes, for each of the at least one emulated channel, an antenna. In some embodiments, the impairment is at least one of an amplitude weighting and a temporal shift. In some embodiments, the system includes, within the chamber, for each of the at least one emulated channel, a variable gain amplifier within a path of a received RF signal to adjustably amplify the RF signal. In some embodiments, the down-converted signal is at an intermediate frequency, IF. In some embodiments, the down-converted signal is at baseband. In some embodiments, the system includes, within the chamber, for each of the at least one emulated channel, an analog to digital converter, ADC, configured to convert the down-converted signal from analog form to digital form.

In some embodiments, an electromagnetic measurement system to test a device under test, DUT, in a chamber is provided. Within the chamber, for each of at least one emulated channel, an emulator core is configured to introduce an impairment in each of at least one transmit signal to produce an impaired signal. A radio frequency, RF, transmitter is configured to mix a local oscillator, LO, signal with the impaired signal to produce a radio frequency, RF, signal.

In some embodiments, the chamber is one of an anechoic chamber and a reverberation chamber. In some embodiments, the impairment is at least one of an amplitude weighting and a temporal shift. In some embodiments, the system includes, for each of the at least one emulated channel, an antenna configured to radiate the RF signal to the DUT. In some embodiments, for each of the at least one emulated channel, the RF transmitter includes a digital to analog converter that converts the impaired signal from digital form to analog form. In some embodiments, the RF transmitter includes a variable gain amplifier configured to amplify the RF signal. In some embodiments, the system includes, exterior to the anechoic chamber, a communication tester configured to generate the at least one transmit signal.

In some embodiments, an electromagnetic measurement system to test a device under test, DUT, in a chamber is provided. The system includes, within the chamber, for each of at least one emulated channel, a receiver configured to mix a local oscillator, LO, signal with a radio frequency, RF, signal received from an antenna to produce a down-converted signal for the emulated channel. The system further includes, within the chamber, an emulator core to introduce an impairment in each of at least one replica of the down converted signal to produce at least one output signal.

In some embodiments, the chamber is one of an anechoic chamber and a reverberation chamber. In some embodiments, the impairment is at least one of an amplitude weight and a temporal shift. In some embodiments, the system further includes, for each of the at least one emulated channel, an antenna configured to receive the RF signal from the DUT. In some embodiments, the system further includes, exterior to the chamber, a plurality of transmitters, each transmitter receiving one of the plurality of output signals. In some embodiments, the system includes, exterior to the chamber, a communication tester to receive and test the plurality of output signals.

In some embodiments, an electromagnetic measurement system to test a device under test, DUT, is provided. The system includes a plurality of nodes, each node having a combination of a communication tester configured to generate a communication signal and a channel emulator configured to emulate a channel.

In some embodiments, the communication testers in the plurality of nodes are synchronized in time. In some embodiments, the communication testers are synchronized in content. In some embodiments, each combination further comprises an antenna coupled to the channel emulator of the combination. In some embodiments, the combinations, the antennas and the DUT are located within a chamber. In some embodiments, the chamber is one of an anechoic chamber and a reverberation chamber.

In some embodiments, an electromagnetic measurement system to test a device under test, DUT, is provided. The system includes a plurality of nodes, each node having a combination of a channel emulator configured to receive a signal and emulate a channel and a communication tester configured to receive a communication signal.

In some embodiments, the communication testers are synchronized in time. In some embodiments, each combination further includes an antenna coupled to the channel emulator. In some embodiments, at least one antenna is a dual-polarized antenna. In some embodiments, the combinations, the antennas and the DUT are located within a chamber. In some embodiments, the chamber is one of an anechoic chamber and a reverberation chamber. In some embodiments, the outputs of the channel emulators are summed or averaged in at least one node.

In some embodiments, an electromagnetic measurement system to test a device under test, DUT is provided. The system includes, at a central location, an emulator core configured to introduce an impairment in each of at least one transmit signal to produce a digital impaired signal; and at a remote location, a transmitter configured to convert the digital impaired signal to an analog RF signal.

In some embodiments, the transmitter includes a digital to analog converter and a frequency up-converter. In some embodiments, the system further includes, at the central location, a communication tester configured to generate the at least one transmit signal. In some embodiments, the remote location is within a test chamber and the central location is exterior to the test chamber. In some embodiments, the system further includes a cable configured to carry the digital impaired signal from the central location to the remote location.

In some embodiments, an electromagnetic measurement system to test a device under test, DUT, is provided. The system includes, at a remote location, a receiver configured to convert an analog RF signal to a digital signal; and at a central location, an emulator core configured to introduce an impairment in each of at least one replica of the digital signal to produce at least one impaired signal.

In some embodiments, the receiver includes a frequency down converter and an analog to digital converter. In some embodiments, the system further includes, at the central location, a communication tester configured to receive the at least one impaired signal. In some embodiments, the remote location is within a test chamber and the central location is exterior to the test chamber. In some embodiments, the system further includes a cable configured to carry the digital signal from the remote location to the central location.

In some embodiments, an electromagnetic measurement system to test a device under test, DUT, is provided. The system includes, at a remote location, for each of at least one emulated channel: a first emulator core configured to introduce an impairment in each of at least one transmit signal to produce an impaired signal; and a transmitter configured to convert the impaired signal to a radio frequency, RF, signal.

In some embodiments, the transmitter includes a digital to analog converter and a frequency up-converter. In some embodiments, the system includes, at a central location, a communication tester configured to generate the at least one transmit signal. In some embodiments, the remote location is within a test chamber and the central location is exterior to the test chamber. In some embodiments, the system further includes a cable configured to carry the impaired signal from the central location to the remote location.

In some embodiments, an electromagnetic measurement system to test a device under test, DUT is provided. The system includes, at a remote location, for each of at least one emulated channel, a receiver configured to receive a radio frequency, RF, signal and convert the received RF signal to a down-converted signal; and an emulator core configured to introduce an impairment in each of at least one replica of the down converted signal to produce at least one output signal.

In some embodiments, the receiver includes a frequency down converter and an analog to digital converter. In some embodiments, the system includes, at a central location, a communication tester configured to process the at least one output signal. In some embodiments, the remote location is within a test chamber and the central location is exterior to the test chamber. In some embodiments, the system includes a cable configured to carry the impaired signal from the remote location to the central location.

Embodiments advantageously provide a method and system for measuring a device under test. In some embodiments, a method of implementing a measurement system is provided. The method includes providing a plurality of nodes, each node including a combination of a communication tester configured to generate a communication signal and a channel emulator configured to emulate a channel, and providing a user interface configured to enable a user to control at least one of the plurality of nodes.

In some embodiments, the method further includes providing signal communication with the plurality of nodes to synchronize the communication testers in time. In some embodiments, the method further includes providing signal communication with the plurality of nodes to synchronize the communication testers in content. In some embodiments, the method further includes locating the plurality of nodes within a test chamber. In some embodiments, the communication signals are digital signals. In some embodiments, the method further includes at each node, an antenna. In some embodiments, the method further includes disposing the nodes about a test volume.

In some embodiments a method of implementing a measurement system is provided. The method includes providing a plurality of nodes, each node having a combination of a channel emulator configured to receive and impair a communication signal and a communication tester configured to receive an impaired communication signal. The method also includes providing a user interface configured to enable a user to control at least one of the plurality of nodes.

In some embodiments, the method further includes locating the plurality of nodes within a test chamber. In some embodiments, the method further includes providing at each node, an antenna. In some embodiments, the method further includes disposing the nodes about a test volume. In some embodiments, each communication tester is configured to receive digital signals from a corresponding channel emulator. In some embodiments, at least one communication tester is configured to receive digital signals from a plurality of channel emulators.

In some embodiments, another method of implementing a measurement system is provided. The method includes providing at a central location an emulator core configured to introduce an impairment in a transmit signal to produce an impaired signal for an emulated channel. The method further includes providing at a remote location, an up-converter configured to up-convert an impaired signal to produce a radio frequency, RF, signal.

In some embodiments, the method further includes at the central location, a communication tester configure to generate the transmit signal. In some embodiments, the remote location is within a test chamber and the central location is exterior to the test chamber.

In some embodiments, another method of implement a measurement system is provided. The method includes providing at a remote location, for each of at least one emulated channel, a down-converter configured to down-convert a radio frequency, RF, signal to produce a down-converted signal. The method further includes providing at a central location, an emulator core configured to introduce an impairment in the down-converted signal to produce an impaired receive signal.

In some embodiments, the method further includes at the central location, a wireless communication tester configured to process the impaired receive signal. In some embodiments, the remote location is within a test chamber and the central location is exterior to the test chamber. In some embodiments, the down-converted signal is digitized prior to introducing the impairment.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby form a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to support claims to any such combination or subcombination.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An electromagnetic measurement system to test a device under test, DUT, the system comprising:
   a plurality of nodes distributed at a plurality of angles around the DUT, each node within an anechoic chamber each node including a combination of:
   an antenna located at the node and positioned to one of capture a signal from antennas of the DUT and radiate a signal to the antennas of the DUT;
   at least one of a transmitter and a receiver located at the node and in between and in proximity to the antenna and a channel emulator core;
   a channel emulator core located at the node in between and in proximity to the at least one of the transmitter and receiver, and a communication tester located at the node; and
   the communication tester in proximity to and in communication with the channel emulator core located at the node, the communication tester configured, when operating in an outgoing mode, to generate a digital outgoing communication signal to be impaired by the channel emulator core and the communication tester configured, when operating in an incoming mode, to receive an incoming communication signal impaired by the channel emulator core;
   the channel emulator core configured to emulate a channel by impairing the digital outgoing communication signal if operating in the outgoing mode and impairing an incoming digital communication signal when operating in the incoming mode to produce an impaired communication signal, such that when operating in the incoming mode, impaired signals from a channel emulator core of a first node are sent to at least one other node to be combined with impaired signals of the at least one other node.

2. The system of claim 1, wherein, when operating in the incoming mode, a first node receives impaired signals from at least one other node to be combined with impaired signals from a channel emulator core of the first node.

3. An electromagnetic measurement system to test a device under test, DUT, the system comprising:
   a plurality of nodes distributed about the test zone, each node having in proximity, an antenna, one of a transmitter and a receiver, a channel emulator core and a communication tester, the channel emulator core configured to receive a digital signal and emulate a channel, and the communication tester configured to receive a digital communication signal when operating in an incoming mode and transmit a digital communication signal when operating in an outgoing mode; and when operating in the outgoing mode, the plurality of communication testers in the plurality of nodes being configured to generate a set of outgoing signals that are synchronized in content so that by impairing each such synchronized outgoing signal by a different impairment, a spatial channel having multiple different paths affecting a signal radiated from a source of the content is emulated, such that when operating in the incoming mode, a first node receives impaired signals from at least one other node to be combined with impaired signals from a channel emulator core of the first node.

4. The system of claim 3, wherein, when operating in the incoming mode, communication signals impaired by a channel emulator core of a first node are sent to at least one other node to be combined with impaired signals of the at least one other node.

5. The system of claim 1, wherein, when operating in the outgoing mode, each communication tester generates multiple outgoing communication signals, each outgoing communication signal of the multiple outgoing communication signals contributing to emulation of a different spatial channel.

6. The system of claim 1, wherein control signals from the controller cause each channel emulator core to impair an outgoing communication signal received from a respective communication tester by at least one of delay, attenuation and Doppler shift, to emulate propagation on a particular path of the spatial channel.

7. The system of claim 1, wherein, when operating in the incoming mode, each channel emulator core for each node impairs replicas of a signal received via an antenna from the DUT, each replica being impaired by a different impairment to effectuate emulation of multiple spatial channels.

8. The system of claim 1, wherein the communication tester and channel emulator core of a node are merged into a single software-defined radio for a desired communication protocol.

9. The system of claim 8, wherein a desired impairment in the outgoing mode is applied to a digital instantiation of an outgoing communication signal prior to analog conversion of the outgoing communication signal.

10. The system of claim 8, wherein a desired impairment in the incoming mode is applied to a digital instantiation of the incoming communication signal before decoding of the incoming communication signal.

11. The system of claim 3, wherein, when operating in the outgoing mode, each communication tester generates multiple outgoing communication signals, each outgoing communication signal of the multiple outgoing communication signals contributing to emulation of a different spatial channel.

12. The system of claim 3, wherein, when operating in the incoming mode, each channel emulator core for each node impairs replicas of a signal received via an antenna from the DUT, each replica being impaired by a different impairment to emulate multiple spatial channels.

13. The system of claim 3, wherein the communication tester and channel emulator core of a node are merged into a single software-defined radio for a desired communication protocol.

14. The system of claim 13, wherein a desired impairment in the outgoing mode is applied to a digital instantiation of an outgoing communication signal prior to analog conversion of the outgoing communication signal.

15. The system of claim 3, further comprising, in each node, a transmitter operable in an outgoing mode to:
receive the impaired outgoing communication signal in digital form from the channel emulator core of the node;
convert the digital outgoing communication signal to an analog signal; and
upconvert the analog signal to an RF signal by mixing the analog signal with a signal from an oscillator.

16. The system of claim 15, wherein each one of a plurality of differently impaired outgoing communication signals from one channel emulator core is mixed with an oscillator signal of a different frequency.

17. A measurement system to test a device, the system comprising:
a plurality of nodes distributed about the test zone, each node having an antenna, and in proximity to the antenna, a transmitter, a channel emulator core and a communication tester, each communication tester operable in an outgoing mode to generate an outgoing communication signal, each channel emulator core operable to impair the outgoing communication signal to produce an impaired signal, each node being synchronized to generate first content in an outgoing communication signal of the node, such that the impaired signals from each of the plurality of nodes collectively emulate a spatial channel experienced by a signal from a source of the first content, such that when operating in the outgoing mode, impaired signals from a channel emulator core of a first node are sent to at least one other node to be combined with impaired signals of the at least one other node.

18. A measurement system to test a device, the system comprising:
a plurality of nodes distributed about the test zone, each node having an antenna, receiver, a channel emulator core and a communication tester each channel emulator core operable in an incoming mode to receive an incoming communication signal from the antenna, and to impair the incoming communication signal to produce an impaired signal, the impaired signals from each node being combined and processed at a communication tester at one of the plurality of nodes.

19. The system of claim 1, further comprising:
a controller to provide control signals to each communication tester, the control signals being configured to synchronize the communication testers in time and content; and
if operating in the outgoing mode, the plurality of communication testers in the plurality of nodes being configured to generate a set of outgoing signals that are synchronized in content so that by impairing each such synchronized outgoing signal by a different impairment, a spatial channel having multiple different paths affecting a signal radiated from a source of the content is emulated.

* * * * *